United States Patent
Cui et al.

(10) Patent No.: US 10,293,489 B1
(45) Date of Patent: May 21, 2019

(54) CONTROL METHOD AND SYSTEM, AND CLEANING ROBOT USING THE SAME

(71) Applicant: ANKOBOT (SHANGHAI) SMART TECHNOLOGIES CO., LTD., Shanghai (CN)

(72) Inventors: Yuwei Cui, Shanghai (CN); Lei Li, Shanghai (CN)

(73) Assignee: Ankobot (Shanghai) Smart Technologies Co., Ltd., Shanghai (CN)

( * ) Notice: Subject to any disclaimer, the term of this patent is extended or adjusted under 35 U.S.C. 154(b) by 0 days.

(21) Appl. No.: 16/131,335

(22) Filed: Sep. 14, 2018

Related U.S. Application Data

(63) Continuation of application No. PCT/CN2018/090659, filed on Jun. 11, 2018.

(30) Foreign Application Priority Data

Dec. 15, 2017 (CN) .......................... 2017 1 1347544

(51) Int. Cl.
*A47L 11/00* (2006.01)
*B25J 11/00* (2006.01)
(Continued)

(52) U.S. Cl.
CPC ........... *B25J 11/0085* (2013.01); *A47L 9/009* (2013.01); *A47L 9/2826* (2013.01); *A47L 11/24* (2013.01);
(Continued)

(58) Field of Classification Search
USPC ................................................ 700/245–264
See application file for complete search history.

(56) References Cited

U.S. PATENT DOCUMENTS 5,202,661 A * 4/1993 Everett, Jr. .......... G05D 1/0255
340/522
5,804,942 A * 9/1998 Jeong .................. G05D 1/0255
318/580
(Continued)

FOREIGN PATENT DOCUMENTS

| CN | 105395144 | 3/2016 |
|---|---|---|
| CN | 106725127 | 5/2017 |
| CN | 106998984 | 8/2017 |

OTHER PUBLICATIONS

International Patent Application No. PCT/CN2018/090659, International Search Report and Written Opinion with English translation of Opinion, dated Sep. 14, 2018.

*Primary Examiner* — Jonathan L Sample
(74) *Attorney, Agent, or Firm* — Leber IP Law; David C. Robertson

(57) ABSTRACT

The present application provides a control method and system, and a cleaning robot using the same. The control method comprises the following steps: under a navigation operating environment of the cleaning robot, controlling the image acquisition device to capture images in real time; analyzing at least one captured image; and controlling behaviors of the cleaning robot based on analyzed results and according to a preset cleaning mode, wherein the cleaning mode comprises a cleaning mode corresponding to an underexposure region. In the present application, users can clean some certain regions depending on requirements, thereby realizing the aim of separated-area cleaning according to the requirements of users.

19 Claims, 2 Drawing Sheets

(51) Int. Cl.
| | |
|---|---|
| *B25J 9/16* | (2006.01) |
| *A47L 11/24* | (2006.01) |
| *A47L 11/40* | (2006.01) |
| *A47L 11/29* | (2006.01) |
| *A47L 9/00* | (2006.01) |
| *A47L 9/28* | (2006.01) |
| *G06T 7/73* | (2017.01) |
| *H04N 5/235* | (2006.01) |
| *H04N 5/238* | (2006.01) |

(52) U.S. Cl.
CPC .......... *A47L 11/29* (2013.01); *A47L 11/4011* (2013.01); *A47L 11/4061* (2013.01); *A47L 11/4066* (2013.01); *A47L 11/4072* (2013.01); *B25J 9/1666* (2013.01); *B25J 9/1697* (2013.01); *G06T 7/74* (2017.01); *H04N 5/238* (2013.01); *H04N 5/2351* (2013.01); *H04N 5/2353* (2013.01); *A47L 2201/04* (2013.01); *A47L 2201/06* (2013.01)

(56) References Cited

U.S. PATENT DOCUMENTS

| | | | | |
|---|---|---|---|---|
| 5,961,571 | A * | 10/1999 | Gorr | G01S 3/783 340/988 |
| 6,038,501 | A * | 3/2000 | Kawakami | G05D 1/0227 701/23 |
| 6,041,274 | A * | 3/2000 | Onishi | G01B 11/005 318/580 |
| 7,012,551 | B2 * | 3/2006 | Shaffer | B60R 1/00 315/82 |
| 7,509,213 | B2 * | 3/2009 | Choi | G05D 1/0225 318/568.12 |
| 8,175,743 | B2 * | 5/2012 | Nara | G01B 11/002 356/152.3 |
| 8,352,075 | B2 * | 1/2013 | Cho | G06K 9/00201 700/245 |
| 8,368,339 | B2 * | 2/2013 | Jones | A47L 9/009 318/567 |
| 8,452,450 | B2 * | 5/2013 | Dooley | B60L 50/66 700/258 |
| 8,521,352 | B1 * | 8/2013 | Ferguson | G05D 1/0274 701/25 |
| 8,731,295 | B2 * | 5/2014 | Schepelmann | A01D 34/008 382/173 |
| 8,781,627 | B2 * | 7/2014 | Sandin | G05D 1/0225 700/258 |
| 9,248,835 | B2 * | 2/2016 | Tanzmeister | B60W 30/0956 |
| 9,327,407 | B2 * | 5/2016 | Jones | G05D 1/0219 |
| 9,392,920 | B2 * | 7/2016 | Halloran | A47L 5/30 |
| 10,001,445 | B2 * | 6/2018 | Childress | G01N 21/9081 |
| 2002/0051128 | A1 * | 5/2002 | Aoyama | G01S 7/4811 356/403 |
| 2004/0210344 | A1 * | 10/2004 | Hara | B64C 33/025 700/245 |
| 2005/0134440 | A1 * | 6/2005 | Breed | B60N 2/2863 340/435 |
| 2006/0058921 | A1 * | 3/2006 | Okamoto | G05D 1/0214 700/255 |
| 2006/0129276 | A1 * | 6/2006 | Watabe | G05D 1/0234 700/245 |
| 2006/0136097 | A1 * | 6/2006 | Kim | G05D 1/0234 700/258 |
| 2006/0177137 | A1 * | 8/2006 | Friedhoff | G06K 9/2018 382/199 |
| 2007/0150094 | A1 * | 6/2007 | Huang | G05D 1/0274 700/245 |
| 2007/0192910 | A1 * | 8/2007 | Vu | B25J 5/007 700/245 |
| 2007/0250212 | A1 * | 10/2007 | Halloran | A47L 5/30 700/245 |
| 2007/0285041 | A1 * | 12/2007 | Jones | G05D 1/0219 318/568.12 |
| 2008/0039974 | A1 * | 2/2008 | Sandin | G05D 1/0225 700/258 |
| 2009/0118890 | A1 * | 5/2009 | Lin | G05D 1/0246 701/28 |
| 2010/0172136 | A1 * | 7/2010 | Williamson, III | F41H 13/00 362/259 |
| 2010/0292884 | A1 * | 11/2010 | Neumann | G05D 1/0225 701/25 |
| 2011/0288684 | A1 * | 11/2011 | Farlow | B25J 11/009 700/264 |
| 2012/0078417 | A1 * | 3/2012 | Connell, II | B25J 5/00 700/248 |
| 2012/0182392 | A1 * | 7/2012 | Kearns | B25J 11/009 348/46 |
| 2012/0206336 | A1 * | 8/2012 | Bruder | G01B 11/026 345/156 |
| 2013/0094668 | A1 * | 4/2013 | Poulsen | H03G 3/301 381/107 |
| 2013/0105670 | A1 * | 5/2013 | Borosak | B60Q 1/143 250/214.1 |
| 2013/0226344 | A1 * | 8/2013 | Wong | G05D 1/024 700/258 |
| 2013/0245937 | A1 * | 9/2013 | DiBernardo | G01S 5/163 701/514 |
| 2013/0325244 | A1 * | 12/2013 | Wang | G05D 1/028 701/26 |
| 2014/0009748 | A1 * | 1/2014 | Leonessa | G01C 3/08 356/4.03 |
| 2014/0074287 | A1 * | 3/2014 | LaFary | G06N 3/008 700/253 |
| 2014/0088761 | A1 * | 3/2014 | Shamlian | G05D 1/0238 700/253 |
| 2014/0324270 | A1 * | 10/2014 | Chan | G01S 17/42 701/28 |
| 2015/0054639 | A1 * | 2/2015 | Rosen | G06K 9/00785 340/439 |
| 2015/0125035 | A1 * | 5/2015 | Miyatani | B25J 9/1697 382/103 |
| 2015/0168954 | A1 * | 6/2015 | Hickerson | G01S 17/026 700/259 |
| 2015/0202770 | A1 * | 7/2015 | Patron | G05D 1/024 700/245 |
| 2015/0234385 | A1 * | 8/2015 | Sandin | G05D 1/0225 700/258 |
| 2016/0080625 | A1 * | 3/2016 | Itoh | G06K 9/00771 348/234 |
| 2016/0096272 | A1 * | 4/2016 | Smith | B25J 9/163 700/253 |
| 2016/0121487 | A1 * | 5/2016 | Mohan | B25J 13/006 700/248 |
| 2016/0188985 | A1 * | 6/2016 | Kim | G01S 17/46 701/28 |
| 2016/0274580 | A1 * | 9/2016 | Jung | G05D 1/0022 |
| 2016/0375592 | A1 * | 12/2016 | Szatmary | B25J 5/00 700/255 |
| 2017/0036349 | A1 * | 2/2017 | Dubrovsky | B43L 13/022 |
| 2017/0332869 | A1 * | 11/2017 | Nam | A47L 11/33 |
| 2018/0098676 | A1 * | 4/2018 | Ryu | H04B 17/318 |
| 2018/0139728 | A1 * | 5/2018 | Kozura | G06F 9/5011 |

* cited by examiner

US 10,293,489 B1

CONTROL METHOD AND SYSTEM, AND CLEANING ROBOT USING THE SAME

RELATED APPLICATION

This application is a continuation application of International Patent Application No. PCT/CN2018/090659 filed on Jun. 11, 2018, which claims priority to Chinese Patent Application No. 201711347544.5, filed Dec. 15, 2017, the entire contents of which are hereby incorporated by reference.

TECHNICAL FIELD

The present application relates to the field of intelligent robots, particularly to a control method and system, and a cleaning robot using the same.

BACKGROUND

With the development of science and technology, intelligent robots have gradually come into our life. Wherein the cleaning robot has been widely used because cleaning robots can automatically clean a house with no need of artificial participation. In addition, with the development of motion control technology of mobile robots, VSLAM (Visual Simultaneous Localization and Mapping) technology provides more accurate navigation capabilities for the mobile robots, so that the autonomous movement of mobile robots can be more effective.

At present, when the cleaning robot performs cleaning operations, the robot usually can clean the surface repeatedly while moving in a preset movement mode. However, when the cleaning robot moves to a region where debris is gathered, for example, the region under a bed or a sofa, since too much dust is gathered in the region, users may not want to clean the region or users may want to clean the region after cleaning robot finishes cleaning other regions.

SUMMARY

In view of the above shortcomings in the prior art, the objective of the present application is to provide a control method and system, and a cleaning robot using the same, so as to solve the problem that cleaning operation cannot be performed in an separated-area manner according to the requirements of users in the prior art.

In one aspect, the present application provides a system for controlling a cleaning robot, wherein the cleaning robot comprises an image acquisition device, a movement system and a cleaning system, and the system for controlling a cleaning robot comprises: a storage device, configured to store one or more programs; and a processing device, connected with the storage device and configured to perform the following steps through invoking the one or more programs: under a navigation operating environment of the cleaning robot, controlling the image acquisition device to capture images in real time; analyzing at least one captured image; and controlling behaviors of the cleaning robot based on analyzed results and according to a preset cleaning mode, wherein the cleaning mode comprises a cleaning mode corresponding to an underexposure region.

In some embodiments, the step of analyzing at least one captured image comprises: determining the current position of the cleaning robot based on the localization features identified in at least one image.

In some embodiments, the step of determining the current position of the cleaning robot based on the localization features identified in at least one image comprises: localizing the cleaning robot based on the localization features identified in at least one image and landmark information created in advance.

In some embodiments, the step of analyzing at least one captured image comprises: analyzing whether the cleaning robot is located in an underexposure region based on the grayscale features in at least one image.

In some embodiments, the processing device is further configured to perform a step of determining whether the cleaning robot is located in an underexposure region by analyzing the photosensitive information from photosensitive elements.

In some embodiments, the processing device is further configured to perform a step of analyzing at least one image which is captured after the amount of incoming light in the image acquisition device being adjusted.

In some embodiments, the manner of adjusting the amount of incoming light in the image acquisition device comprises at least one of: adjusting an aperture of the image acquisition device and adjusting the exposure time of the image acquisition device.

In some embodiments, the step of analyzing at least one captured image comprises: analyzing multiple images captured within a preset time duration to determine whether the cleaning robot is located in an underexposure region.

In some embodiments, the processing device is further configured to perform a step of creating landmark information of the underexposure region in map data created in advance; or a step of updating the landmark information of the corresponding underexposure region in the map data created in advance.

In some embodiments, the step of controlling behaviors of the cleaning robot according to a preset cleaning mode comprises: navigating the cleaning robot based on a preset cleaning mode, localization information identified in at least one image and the landmark information.

In some embodiments, the processing device is further configured to perform a step of determining the cleaning mode of the corresponding underexposure region based on user input.

In some embodiments, the step of controlling behaviors of the cleaning robot based on the analyzed results and according to a preset cleaning mode comprises any of the following steps: adjusting the navigation route of the cleaning robot to leave the underexposure region; controlling the cleaning robot to go through the underexposure region according to the original navigation route, and controlling the cleaning robot to clean the underexposure region according to a preset cleaning mode corresponding to the underexposure region.

In some embodiments, the processing device is further configured to perform a step of outputting prompt information after entering the underexposure region.

In another aspect, the present application provides a cleaning robot. The cleaning robot comprises: the system for controlling a cleaning robot as mentioned above, configured to output control instructions corresponding to a preset cleaning mode based on analytic result of the captured images; an image acquisition device, connected to the control system and configured to capture images to be processed by the control system; a movement system, connected with the control system and configured to drive the cleaning robot to move based on the control instructions; and a cleaning system, connected with the control system and configured to perform cleaning operations based on the control instructions.

In some embodiments, the image acquisition device is located on the top surface of the cleaning robot, and the angle between the optic axis of the image acquisition device and the vertical line is ±30°.

In some embodiments, the image acquisition device comprises at least one of an adjustable aperture and an adjustable shutter mechanism which are used to adjust the amount of incoming light in the image acquisition device, and the control system can analyze at least one image which is captured after the amount of incoming light being adjusted by the image acquisition device.

In some embodiments, the movement system comprises: at least two sets of rolling wheels, wherein at least one set of rolling wheels is a set of controlled rolling wheels; and a drive control device, connected with the control system and configured to drive the set of controlled rolling wheels to roll based on the control instructions.

In some embodiments, the cleaning system comprises: a cleaning component; and a cleaning drive control component, connected to the control system and configured to drive the cleaning component to clean the surface based on the control instructions.

In yet another aspect, the present application provides a method for controlling a cleaning robot, wherein the cleaning robot comprises an image acquisition device, a movement system and a cleaning system, and the method comprises the following steps: under a navigation operating environment of the cleaning robot, controlling the image acquisition device to capture images in real time; analyzing at least one captured image; and controlling behaviors of the cleaning robot based on analyzed results and according to a preset cleaning mode, wherein the cleaning mode comprises a cleaning mode corresponding to an underexposure region.

As mentioned above, the control method and system, and the cleaning robot using the same in the present application have the following beneficial effects: through the technical solution that analyzing the captured images and controlling behaviors of the cleaning robot based on analyzed results and according to a preset cleaning mode, users can clean some certain regions depending on requirements, thereby realizing the aim of separated-area cleaning according to the requirements of users.

DETAILED DESCRIPTION

Figure 1:
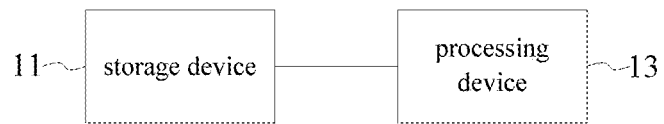
FIG. 1 shows a structural schematic diagram of a control system of a cleaning robot of the present application in one embodiment.

Implementations of the present application will be described below through specific embodiments, and those skilled in the art can easily understand other advantages and effects of the present application from the contents disclosed in the present specification.

In the following description, several embodiments of this application are described combined with the drawings. However, it should be understood that other embodiments may be available, and any changes in mechanical composition, structure, electrical and operation may be made without departing from the spirit and scope of the application. The following detailed description is not to be considered as limited, and the scope of the embodiments of the present invention is defined by the appended claims. The terminology used herein is only for describing particular embodiments, spatial-related terms such as "up", "down", "left", "right", "below", "top", "above", "bottom", etc., may be used in the text for illustrating the relationship of one element or feature to another element or feature.

Moreover, as used herein, such single forms as "one", "a" and "the" aim at also including the plural forms, unless contrarily indicted in the text. It should be further understood that, such terms as "comprise" and "include" indicate the existence of the features, steps, operations, elements, components, items, types and/or groups, but do not exclude the existence, emergence or addition of one or more other features, steps, operations, elements, components, items, types and/or groups. The terms "or" and "and/or" used herein are explained to be inclusive, or indicate any one or any combination. Therefore, "A, B or C" or "A, B and/or C" indicates "any of the following: A; B; C; A and B; A and C; B and C; A, B and C". Exceptions of the definition only exist when the combinations of elements, functions, steps or operations are mutually exclusive inherently in some ways.

The cleaning robot is a device which can automatically clean the region to be cleaned through inhaling debris (for example, dust) from the surface of the region to be cleaned while moving in the region to be cleaned without control of users. Based on the visual information provided by visual sensor and mobile data provided by other motion sensors, a cleaning robot can create map data of the site where the robot is located, and can also provide route planning, route planning adjustment and navigation service based on the created map data, so that the efficiency of the cleaning robot becomes higher. Wherein, the visual sensor for example includes an image acquisition device, and the corresponding visual information is image data (image for short below). The motion sensor for example includes speed sensor, odometer sensor, ranging sensor and cliff sensor. However, when the cleaning robot moves under a bed or a sofa where debris is gathered, since too much dust is gathered in the region, users may not want to clean the region or users may want to clean the region after the cleaning robot finishes cleaning other regions.

In order to solve the above problem, the present application provides a system for controlling a cleaning robot, namely, a control system of a cleaning robot. Wherein, the cleaning robot includes an image acquisition device, a movement system and a cleaning system.

The image acquisition device is connected with a control system of the cleaning robot, and the image acquisition device is configured to capture images to be processed by the control system. The image acquisition device includes but is not limited to a camera, a video camera, an image acquisition module integrated with an optical system or a CCD chip, and an image acquisition module integrated with an optical system and a CMOS chip. A power supply system of the image acquisition device can be controlled by a power supply system of the cleaning robot. During movement of the robot, the image acquisition device starts to capture images. In addition, the image acquisition device can be arranged on the main body of the cleaning robot. For example, the image acquisition device can be arranged in the middle or at the edge of the top cover of the cleaning robot, or the image acquisition device can be arranged below the plane of the top surface of the cleaning robot, and in a concave structure near the geometric center of the main body or near the edge of the main body. In some embodiments, the image acquisition device can be arranged on the top surface of the cleaning robot, and the angle between the optic axis of the image acquisition device and the vertical line is ±30°. For example, the image acquisition device is located in the middle or at the edge of the top surface of the cleaning robot, and the angle between the optic axis of the image acquisition device and the vertical line is −30°, −29°, −28°, −27° . . . −1°, 0°, 1°, 2° . . . 29° or 30°. It should be noted that, those skilled in the art should understand that the angle between the optic axis and the vertical line is only an example but not to limit the accuracy of the angle thereof within the range of 1°. The accuracy of the angle can be higher according to the actual design requirements of the robot, for example, more than 0.1°, 0.01° or the like. Endless examples will not be recited herein.

The movement system is connected with a control system of the cleaning robot, and the movement system drives the cleaning robot to move based on control instructions output by the control system. In one embodiment, the movement system includes a drive control device and at least two sets of rolling wheels, wherein at least one set of rolling wheels in at least two sets of rolling wheels is a set of controlled rolling wheels. The drive control device is connected with the control system, and the drive control device is configured to drive the set of controlled rolling wheels to roll based on the control instructions output by the control system.

The drive control device includes a drive motor, and the drive motor is connected with the set of rolling wheels and is configured to directly drive the set of rolling wheels to roll. The drive control device can include one or more processors (for example, CPU or micro processing unit (MCU)) dedicated to the control of the drive motor. For example, the micro processing unit is configured to convert the control instructions output by the control system into electric signals used to control the drive motor, and control the rotating speed and steering of the drive motor according to the electric signals so as to drive the cleaning robot to move. The processor in the drive control device can be shared with the processor in the control system or can be arranged independently. For example, the processor in the drive control device is used as a slave processing device, the processor in the control system is used as a primary device, and the drive control device performs movement control based on the control of the control system. Or the processor in the drive control device is shared with the processor in the control system. The drive control device receives control instructions output by the control system through a program interface. The drive control device is configured to drive the set of controlled rolling wheels to roll based on the control instructions output by the control system.

The cleaning system is connected with the control system of the cleaning robot, and the cleaning system performs cleaning operations based on the control instructions output by the control system. In one embodiment, the cleaning system includes a cleaning component and a cleaning drive control component, wherein the cleaning drive control component is connected to the control system, and the cleaning drive control component is configured to drive the cleaning component to clean the surface based on the control instructions output by the control system.

The cleaning component can include a roller brush component, a filter net, a scrubbing component, an inhaling pipeline, a dust collection box (or a garbage box), and an air draft motor, etc. Based on the actual design of a cleaning robot, the roller brush component and the scrubbing component can be both arranged on the cleaning robot, or any one of them can be arranged on the cleaning robot. The roller brush component includes but is not limited to a side brush, a side brush driver, a rolling wheel, a rolling wheel driver, etc. The scrubbing component includes but is not limited to a water container, a scrubbing cloth, a configuration structure of the cloth, and a driver of the configuration structure, etc.

The cleaning drive control component can include one or more processors (for example, CPU or micro processing unit (MCU)) dedicated to the control of the cleaning component. The processor in the cleaning drive control component can be shared with the processor in the control system or can be arranged independently. For example, the processor in the cleaning drive control component is used as a slave processing device, the processor in the control system is used as a primary device, and the cleaning drive control component performs cleaning operations based on the control instructions output by the control system. Or the processor in the cleaning drive control component is shared with the processor in the control system.

Please refer to FIG. 1 which shows a structural schematic diagram of a control system of a cleaning robot of the present application in one embodiment. As shown in the figure, the control system of the cleaning robot of the present application includes a storage device 11 and a processing device 13.

The storage device 11 is configured to store one or more programs. The programs include corresponding programs invoked by the processing device 13 to perform steps such as controlling and analyzing which will be described below. The storage device includes but is not limited to a high speed random access memory and a non-volatile memory, for example, one or more disk storage devices, flash storage devices or other non-volatile solid state storage devices. In some embodiments, the storage device can also include a storage away from one or more processors, for example, a network attached storage accessed via an RF circuit or an external port and a communication network (not shown). Wherein the communication network can be an Internet, one or more intranets, a local area network (LAN), a wireless local area network (WLAN), a storage area network (SAN) or an appropriate combination thereof. A storage controller can control the access of other assemblies of robot such as a central processing unit (CPU) and a peripheral interface to the storage device.

The processing device 13 is connected with a storage device 11 and can communicate with the image acquisition device, the movement system and the cleaning system. The processing device 13 can include one or more processors. The processing device 13 can be operably coupled to a volatile memory and/or a non-volatile memory in the storage device 11. The processing device can execute instructions stored in the storage and/or non-volatile memory to perform operations in the robot, for example, analyzing the captured images and controlling behaviors of the cleaning robot based on the analyzed results. Thus, the processor can include one or more general-purpose microprocessors, one or more application specific integrated circuits (ASIC), one or more digital signal processors (DSP), one or more field programmable gate arrays (FPGA) or any combination thereof. The processing device is also operably coupled to an I/O port and an input structure, wherein the robot can interact with various other electronic apparatus by the I/O port, and the user can interact with a computing apparatus by the input structure. Therefore, the input structure can include a button, a keyboard, a mouse, a touchpad and the like. The other electronic apparatus can be a mobile motor in the movement device of the robot, or a slave processor dedicated to the control of the movement device in the robot, for example, a microcontroller unit (MCU).

In an example, the processing device is connected with the storage device, the image acquisition device, the movement system and the cleaning system respectively through data cables. The processing device interacts with the storage device through a data read-write technology, and the processing device interacts with the image acquisition device, the movement system and the cleaning system through an interface protocol. Wherein the data read-write technology includes but is not limited to a high-speed/low-speed data interface protocol, a database read-write operation and the like. The interface protocol includes but is not limited to an HDMI interface protocol, a serial interface protocol and the like.

The processing device 13 performs the following steps through invoking the programs stored in the storage device 11: under a navigation operating environment of a cleaning robot, controlling the image acquisition device to capture images in real time; analyzing at least one captured image; and controlling behaviors of the cleaning robot based on analyzed results and according to a preset cleaning mode, wherein the cleaning mode includes a cleaning mode corresponding to an underexposure region. The navigation operating environment indicates the environment in which the robot moves according to the current localization and the navigation route determined based on the current localization and performs corresponding operations. Specifically, the navigation operating environment of a cleaning robot indicates the environment in which a cleaning robot moves according to a navigation route and performs cleaning operations.

Firstly, the processing device 13 controls the image acquisition device to capture images in real time under a navigation operating environment of the cleaning robot. For example, the image acquisition device can be a camera used for capturing static images or videos. In one embodiment, the cleaning robot can preset a time interval for capturing images according to the navigation operating environment, and then the processing device controls the image acquisition device to capture images at the preset time interval to acquire static images at different time. In another embodiment, the processing device controls the image acquisition device to capture videos.

And then, the processing device 13 analyzes at least one captured image. Wherein, when the images acquired by the image acquisition device are static images, the processing device can analyze at least one image in the acquired static images. When the image acquisition device acquires video, since the video is composed of image frames, the processing device can first continuously or discontinuously collect image frames in the acquired video, and then select one frame of image to serve as an image for analysis. The processing device can analyze one or more images.

Next, the processing device 13 controls behaviors of the cleaning robot based on analyzed results and according to a preset cleaning mode, wherein the cleaning mode includes the cleaning mode corresponding to an underexposure region, the analyzed results include the cleaning robot being located in an underexposure region or the robot being not located in an underexposure region. The underexposure region indicates a darker region formed when objects block the light emitted by a light source (the sun or a lamp, etc.) such that the light cannot penetrate through opaque objects, such as the region under a bed or a sofa. In addition, the underexposure region can also indicate that when a cleaning robot enters a region with a weak light intensity, the amount of incoming light of the image acquisition device is insufficient, which leads to the brightness contained in the captured images is lower than a preset brightness threshold, namely, image underexposure. Wherein the brightness contained in the captured images can be described via image grayscale values, for example, when the processing device detects that the grayscale value in a region contained in the image is smaller than a preset grayscale threshold, the image can be determined to be an underexposure image, then the cleaning robot can be determined to be located in an underexposure region. In some embodiments, the brightness can also be described by the light intensity values provided by an illumination sensor in the image acquisition device, for example, the processing device acquires images and corresponding light intensity data, when the light intensity data is less than a preset light intensity threshold, the processing device determines that the cleaning robot locates in an underexposure region. Or in some embodiments, the processing device determines whether the cleaning robot locates in an underexposure region based on the grayscale values and light intensity data in the image. For example, the processing device determines that the cleaning robot is located in an underexposure region in a way of simultaneously satisfying two conditions described in the above two examples.

The preset cleaning mode can be set in advance, and is stored by the storage device in the cleaning robot. The cleaning mode can also be obtained through limiting the cleaning region of the robot in advance. In one embodiment, users can set cleaning regions in different classification manners. For example, in terms of underexposure, the cleaning region can be set, by the processing device, to include an underexposure region and a non-underexposure region. For another example, in terms of room planning, the cleaning region can be set to include a room region, a living room region, and a kitchen region, and so on. And the regions among different classifications can be overlapped with each other, for example, the regions under a bed or a sofa in the living room region can belong to an underexposure region, while other regions in the living room region can belong to a non-underexposure region. By means of each set cleaning region, users can input a cleaning mode corresponding to each cleaning region into the cleaning robot. The cleaning mode includes a cleaning mode corresponding to the underexposure region. For example, the cleaning mode corresponding to the underexposure region can be set to cleaning paused when the cleaning robot is located in an underexposure region, or cleaning delayed when the cleaning robot is located in an underexposure region, or cleaning enhanced when the cleaning robot is located in an underexposure region, or cleaning continued when the cleaning robot is located in an underexposure region. The cleaning mode can include sweeping, dust collecting, mopping or any combination thereof. For example, cleaning delayed indicates that when the cleaning robot is located in an underexposure region, the cleaning robot does not clean the underexposure region but cleans other regions, and after the other regions are cleaned, the cleaning robot returns to clean the underexposure region. Cleaning enhanced indicates that enhancing the cleaning effect through adjusting the cleaning mode of the cleaning component, for example, increasing the rotating speed of a roller brush component, spraying liquid through a liquid applicator, increasing pressure of a scrubbing component and increasing the suction force of a vacuum airway and so on. The cleaning mode can also include other cleaning modes, for example, cleaning continued when the cleaning robot is not located in an underexposure region.

The processing device in the cleaning robot can determine the cleaning mode of the corresponding underexposure region based on user input. Herein, the cleaning robot can further include a human-computer interaction device which is connected with the processing device. Users can input cleaning mode corresponding to each underexposure region on the human-computer interaction device provided by the cleaning robot. Or, the cleaning robot includes a network device which is connected with the processing device, the processing device can perform data transmission with other intelligent terminals (such as a mobile phone, a tablet computer and a personal computer) of users via the network device, the input cleaning mode corresponding to each underexposure region can be transmitted to the processing device via user's operation on other intelligent terminals, and the processing device stores the corresponding relationship in the storage device of the cleaning robot. Wherein the underexposure region can be marked in advance, or obtained through image analysis by a cleaning robot, or determined based on the label marked in advance and image analysis. Each underexposure region can correspond to a unified cleaning mode, or correspond to each cleaning mode individually, or correspond to a cleaning mode according to the classification of the underexposure region, etc.

Behaviors of the cleaning robot can include moving along the original navigation route and continue cleaning, moving along the original navigation route and pause cleaning, moving along the original route and enhance cleaning, moving along the original navigation route and delay cleaning, and modifying the navigation route and continue cleaning when the cleaning robot is located in an underexposure region. Behaviors of the cleaning robot can also include continue cleaning along the original navigation route when the cleaning robot is not located in an underexposure region.

It should be noted that, the above cleaning mode and behaviors of the cleaning robot are merely exemplary, rather than limiting the cleaning mode and behaviors of the cleaning robot in the present application. In fact, those skilled in the art can set other cleaning modes and behaviors of the cleaning robot based on the types of cleaning robot and user requirements, and these will not be described herein.

As to the control system of the cleaning robot in the present application, through the technical solution in which the processing device analyzes the images captured by the image acquisition device and controls behaviors of the cleaning robot based on the analyzed results and according to a preset cleaning mode, users can clean some certain regions depending on requirements, thereby realizing the aim of separated-area cleaning according to the requirements of users.

In order to localize the current position of the cleaning robot accurately, the step that the processing device analyzes at least one captured image includes: determining the current position of the cleaning robot based on the localization features identified in at least one image, wherein the localization features include but are not limited to shape features and grayscale features. The shape features include but are not limited to corner features, line features, edge features and curve features. The grayscale features include but are not limited to grayscale jump features, grayscale values greater than or less than a grayscale threshold, region dimensions of a preset grayscale range contained in the image frames. In addition, in order that the cleaning robot can acquire sufficient localization features, the number of localization features identified in the images is multiple, for example, more than 10.

In one embodiment, the processing device can determine the current position of the cleaning robot based on the localization features identified in at least one image. For example, the localization information of the robot in the current physical space is acquired through identifying the picture of an object in the captured image and matching that picture with the picture of a standard component and determining the localization information based on standard physical features of the standard component. For another example, the localization information of the robot in the current physical space is determined through matching the features identified in the image with the features in landmark information in the preset map data. In another embodiment, the processing device can determine the current position of the cleaning robot based on the localization features identified in at least two images. For example, the position and pose of the robot can be determined based on the position offset information of the matching features in two image frames. In still another embodiment, the processing device can localize the cleaning robot based on the localization features identified in at least one image and landmark information created in advance. Wherein, the landmark information can be an attribute information which is collected during each navigation period and corresponds to localization points in the map data. The landmark information includes but is not limited to localization features captured by the image acquisition device on a certain localization point of the map data, the map data of the localization features in the physical space when the localization features are captured each time, the positions of the localization features in corresponding image frames when the localization features are captured each time, and position and pose of the cleaning robot when the corresponding localization features are captured. The landmark information can be stored in the storage device together with the map data. The map data can be created in advance based on an SLAM (Simultaneous Localization and Mapping) or VSLAM technology.

In addition, when the processing device performs localization analysis based on at least one captured image, not necessarily limited by a time sequence, the processing device further determines whether the cleaning robot is located in an underexposure region based on the grayscale features in at least one image. In practical applications, when the cleaning robot is located in an underexposure region, the cleaning robot is usually located under a bed or a sofa. When the cleaning robot is located under a bed or a sofa, since too much dust is gathered in the region, users may not want to clean the region or users may want to clean the region after the cleaning robot finishes cleaning other regions.

Therefore, the processing device analyzes whether the robot is located in an underexposure region. Herein, the processing device analyzes the underexposure region based on the images captured by the image acquisition device. Herein, the images captured by the image acquisition device are usually of an RGB color mode, thus, the processing device should perform grayscale processing on the captured images to obtain grayscale images, and then the grayscale images are subjected to overexposure analysis to determine whether the image acquisition device is located in an underexposure region. Wherein, the processing device can perform grayscale processing on the captured images to obtain grayscale images through component method, a maximum value method, a mean value method or a weighted mean method and so on. Grayscale image is monochrome image with 256 gray levels or scales from black to white, wherein 255 represents white and 0 represents black.

In one embodiment, the processing device determines whether the cleaning robot is located in an underexposure region through an analysis on the grayscale distribution, and average, maximum and minimum grayscale values in the grayscale images. In one example, when the grayscale feature is indicated by grayscale distribution, and when the processing device determines that the grayscale distribution is centered in a preset grayscale underexposure interval after analyzing the grayscale distribution in the grayscale images, the processing device determines that the cleaning robot is located in an underexposure region. For example, the grayscale underexposure interval can be obtained according to technical experiences or experimental designs and is stored in the cleaning robot in advance.

In one specific example, the processing device can analyze at least one image which is captured after the amount of incoming light is adjusted by the image acquisition device. Wherein, the image acquisition device can be an image acquisition device with an adjustable aperture and/or an adjustable shutter mechanism. The adjustable aperture can adjust the amount of incoming light in the image acquisition device through adjusting the sectional area of light entering the image acquisition device. The adjustable shutter mechanism can adjust the amount of incoming light in the image acquisition device through adjusting how long light enters the image acquisition device. After the image acquisition device adjusts the exposure time and/or the aperture to increase the amount of incoming light, the processing device can acquire and analyze at least one image captured by the image acquisition device. For example, the processing device can acquire at least one image with time delay, and analyze at least one image with increased amount of incoming light. Wherein, during the time delay, the image acquisition device adjusts the exposure time and/or adjusts the aperture to increase the amount of incoming light. For another example, the processing device can determine that whether the amount of incoming light is adjusted by the image acquisition device through comparing plurality of images, and analyze at least one image with increased amount of incoming light. Herein, when the image acquisition device is in an underexposure region, the amount of incoming light can be increased automatically through enlarging the aperture, and then, the processing device performs the above underexposure analysis on at least one image captured by the adjusted image acquisition device, so as to improve the accuracy of the analyzed results. Although the manner in which the processing device analyzes the captured images can respond to the cleaning mode corresponding to the underexposure region timely, in some practical applications, since this type of image acquisition device can automatically adjust the aperture under different light intensities, the grayscale of the captured images can be generally lower as the aperture is not adjusted timely when the light intensity changes. In order to avoid the problem that the processing device analyzes a single image and obtains an inaccurate result, multiple images can be subjected to an underexposure analysis, so as to improve the accuracy of underexposure analysis.

In addition, in other practical applications, the image acquisition device can be blocked by objects within a short time period. When the image acquisition device is blocked, in order to prevent the interference of blocking on the analyzed results of the processing device, the processing device can analyze multiple images captured within a preset time duration to determine whether the cleaning robot is located in an underexposure region, wherein the preset time duration can be obtained according to technical experiences or experimental designs and is stored in the cleaning robot in advance. Generally, the preset time duration can be of a millisecond level. For example, when the processing device detects that one image is underexposed, and detects that at least one image subsequently captured by the image acquisition device is also underexposed, then the processing device determines that the robot is located in an underexposure region.

In another embodiment, the processing device can also determine whether the cleaning robot is located in an underexposure region through analyzing the photosensitive information from a photosensitive element, wherein the photosensitive element includes but is not limited to a photoresistor, a phototriode, a photomultiplier, a CCD element, a CMOS device, etc. In addition, the photosensitive element can be arranged on the main body of the cleaning robot. For example, the photosensitive element can be arranged on the front edge along an travelling direction of the top cover of the cleaning robot, or multiple photosensitive elements can be arranged at the edge of the top cover of the cleaning robot at intervals, such that when a part of the cleaning robot enters the underexposure region, the cleaning robot can be determined to be located in an underexposure region. In some embodiments, firstly, the photosensitive element converts the induced light intensity into light intensity data and outputs them to the processing device, and then, the processing device analyzes the light intensity data to determine whether the cleaning robot is located in an underexposure region. For example, the processing device presets an underexposure threshold, the processing device determines that the cleaning robot is located in the underexposure region when the obtained light intensity data is lower than the underexposure threshold; otherwise, the processing device determines that the cleaning robot is not located in the underexposure region, wherein the underexposure threshold can be obtained according to technical experiences or experimental designs and is stored in the cleaning robot in advance.

It should be noted that, the manner of determining whether the cleaning robot is located in an underexposure region based on the above one or more analyzing methods is only an example but does not limit the methods for determining whether the cleaning robot is located in an underexposure region in the present application. In fact, those skilled in the art can also determine whether the cleaning robot is located in an underexposure region though evaluating whether the cleaning robot is located in an underexposure region based on the results obtained by multiple grayscale analysis methods in combination with photosensitive element method. These methods will not be described herein. However, the method for determining that the cleaning robot is located in an underexposure region based on the analysis on any image grayscale values mentioned in the present application or based on the improvement on these basis should be deemed as a specific example of the present application.

Then, the processing device performs a step of controlling behaviors of the cleaning robot based on analyzed results and according to a preset cleaning mode, wherein the cleaning mode includes a cleaning mode corresponding to the underexposure region.

Figure 2:
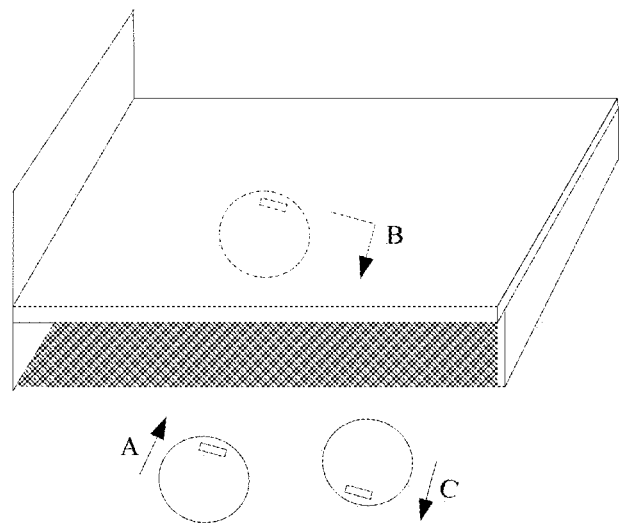
FIG. 2 shows a schematic diagram of a cleaning robot of the present application in an underexposure region in one embodiment.

Herein, when the processing device controls the movement system to move to an underexposure region based on a route which is planned in advance, a corresponding cleaning mode can be used to move and perform cleaning operations, wherein the manner in which the processing device controls behaviors of the cleaning robot based on analyzed results and according to a preset cleaning mode includes any of the following manners:

1) adjusting the navigation route of the cleaning robot to leave the underexposure region. Please refer to FIG. 2 which shows a schematic diagram of a cleaning robot of the present application in the underexposure region in one embodiment. As shown in the figure, in the example, the underexposure region is the region under a bed, and the preset cleaning mode corresponding to the underexposure region is not to clean. During the operation of the cleaning robot, the cleaning robot moves along the direction shown by the arrow A in the figure according to the original navigation route and performs cleaning operations, and when the processing device of the cleaning robot analyzes that the cleaning robot is located in the underexposure region, namely under the bed, through any of the above manners, the processing device modifies the navigation route and controls the movement system to leave the underexposure region. In this example, the cleaning robot moves continuously after deflecting by 180° along the rotation arrow B as shown in the figure, such that the cleaning robot leaves the bed, and moves along the direction shown by the arrow C and cleans other non-underexposure regions. It should be noted that, those skilled in the art should understand the cleaning robot moving continuously after deflecting by 180° along the rotation arrow B in the figure is merely exemplary, the deflection angle is not only 180°, and based on actual requirements, multiple deflection angles can be arranged flexibly and will not be enumerated herein.

Figure 3:
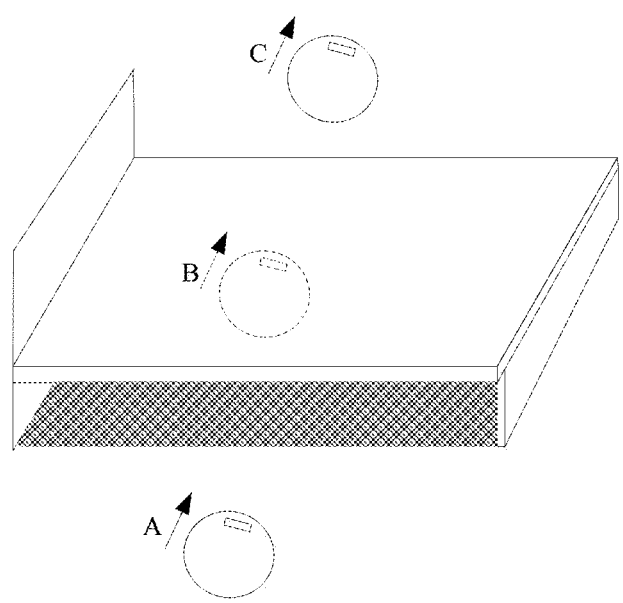
FIG. 3 shows a schematic diagram of a cleaning robot of the present application in an underexposure region in another embodiment.

2) controlling the cleaning robot to go through the underexposure region according to the original navigation route, and controlling the cleaning robot to clean the underexposure region according to a preset cleaning mode corresponding to the underexposure region. Please refer to FIG. 3 which shows a schematic diagram of a cleaning robot of the present application in the underexposure region in another embodiment. As shown in the figure, in one example, the underexposure region is the region under a bed, and the preset cleaning mode corresponding to the underexposure region is not to clean. During the operation of the cleaning robot, the cleaning robot moves along the direction shown by the arrow A in the figure according to the original navigation route and performs cleaning operations, and when the processing device of the cleaning robot analyzes that the cleaning robot is located in the underexposure region, namely under the bed, through any of the above manners, on the one hand, the processing device controls the movement system to move along the original route in the direction as shown by the arrow B in the figure, and on the other hand, the processing device controls the cleaning system not to clean the underexposure region in which the cleaning robot is located now, until the cleaning robot is detected in an non-underexposure region, the processing device controls the movement system to move along the original route in the direction as shown by the arrow C in the figure and controls the cleaning system to perform cleaning operations according to the cleaning mode corresponding to a non-underexposure cleaning region. In another example, the preset cleaning mode corresponding to an underexposure region is cleaning enhanced. During the operation of the cleaning robot, the cleaning robot moves along the direction shown by the arrow A in the figure according to the original navigation route and performs cleaning operations. When the processing device of the cleaning robot analyzes that the cleaning robot is located in the underexposure region, namely under the bed, through any of the above manners, on the one hand, the processing device controls the movement system to move along the original route in the direction as shown by the arrow B in the figure, and on the other hand, the processing device controls the cleaning system to perform enhanced cleaning on the underexposure region in which the cleaning robot is located, until the cleaning robot is detected in an non-underexposure region, the processing device controls the movement system to move along the original route in the direction as shown by the arrow C in the figure and controls the cleaning system to perform conventional cleaning operations according to the cleaning mode corresponding to a non-underexposure cleaning region.

In a space which need to be cleaned and is not irradiated by a light source, such as a room in which no light is turned on, it is inaccurate for the processing device to control the cleaning system and the movement system in the manner that the cleaning robot can be controlled to use the cleaning mode of not to clean only based on the grayscale features or the photosensitive information of the photosensitive elements. In order to match with various practical applications, the storage device is stored with map data and landmark information, wherein the landmark information not only includes the above attribute information, but also includes the object information characterized by the localization features and the attribute corresponding to the underexposure region. The processing device further performs a step of creating the landmark information of an underexposure region in the map data which are created in advance under a navigation operating environment. When the processing device determines that the cleaning robot moves from a non-underexposure region to an underexposure region, or moves from an underexposure region to a non-underexposure region, attribute information can be added in the map data which are created in advance. For example, the processing device determines the boundary positions of the underexposure region and the non-underexposure region based on real-time localization; and then, the processing device adds the attribute containing the underexposure region at the boundary position in the map data, or adds the attribute of the underexposure region in the existing landmark information near the boundary position.

In practical applications, since home decor items and the light source can change. For example, the feature of the landmark information of the current position is recorded as non-underexposure when the current position is not placed with a sofa, and after a sofa is moved to this position, when the cleaning robot moves to the position, the cleaning robot analyzes that it is located in an underexposure region. For another example, when the sunlight comes into the room, the corresponding room is not an underexposure region, however, when night comes and no light is turned on for illumination, the room is an underexposure region. Therefore, the processing device further performs a step of updating the landmark information of a corresponding underexposure region in the map data created in advance. For example, when the processing device determines that the cleaning robot is located in an underexposure region after an underexposure analysis based on the image or photosensitive device and determines the corresponding landmark information is the attribute of the non-underexposure region, the processing device updates the corresponding landmark information; or when the processing device determines that the cleaning robot is located in a non-underexposure region after an underexposure analysis based on the image or photosensitive device and determines the corresponding landmark information is the attribute of the underexposure region, the processing device updates the corresponding landmark information.

On the basis of the above landmark information is contained, the processing device navigates the cleaning robot based on the preset cleaning mode, the localization information identified in at least one image and the landmark information, wherein the landmark information contains the attribute of the underexposure region and the attribute of the non-underexposure region. In one specific example, the processing device creates a cleaning route which does not contain the underexposure region according to the preset cleaning mode in which the underexposure region is not cleaned and the non-underexposure region is cleaned and according to the landmark information containing the underexposure region attribute in the map data, determines the current position of the cleaning robot based on at least one image captured along the cleaning route, and controls the movement system to move and perform cleaning operations along the cleaning route, then the underexposure region is not cleaned. In another specific example, based on a preset cleaning mode of delay and enhance cleaning in the underexposure region and continue cleaning in the non-underexposure region, and based on the landmark information containing the underexposure region attribute in the map data, the processing device creates a first route of cleaning the non-underexposure region, a second route of moving to the underexposure region from the tail end of the route of the non-underexposure region, and a third route of cleaning the underexposure region; determines the current position of the cleaning robot based on at least one image captured along the first route, and controls the movement system to move and perform cleaning operations along the first route; and the processing device performs localization operation according to the captured images and controls the movement system to move to the initial end of the third route from the tail end of the first route along the second route, and controls the cleaning system not to perform cleaning operations during the period of moving along the second route; and then, the processing device controls the cleaning system to perform corresponding cleaning operations during the period of moving along the third route according to a preset mode of enhance cleaning. Wherein, when moving along the third route, the processing device can perform localization of the current position of the cleaning robot and navigation of the cleaning robot only based on the movement data provided by the movement sensing device in the cleaning robot.

After analysis, when the cleaning robot is determined to be located at the doorway of a room and the corresponding room is located in the underexposure region, the processing device controls behaviors of the cleaning robot according to the cleaning mode of the corresponding room. For example, when the processing device moves to the entrance of a room with no illumination according to the landmark information, the processing device determines that the cleaning robot is located in an underexposure region based on image analysis, the processing device can obtain the door attribute from the localization features identified from the cached image before entering the room and the landmark information containing the identified localization features, so as to determine that the underexposure region is a room need to be cleaned. And then, the processing device can calculate the moved distance and the current position based on the movement data provided by the movement sensing device in the cleaning robot, and controls the movement system in the cleaning robot to move in the room according to the original navigation route. Meanwhile, the processing device further controls the cleaning system of the cleaning robot to clean the surface and the wall of the room.

In addition, in some embodiments, the processing device can also output prompt information after entering an underexposure region. For example, after entering an underexposure region, the processing device can remind users of entering the underexposure region through sounding an alarm or sending messages to a mobile terminal of users.

The present application further provides a method for controlling a cleaning robot, namely, a control method of a mobile robot. The cleaning robot includes an image acquisition device, a movement system and a cleaning system.

The image acquisition device is connected to the control system of the cleaning robot, and is configured to capture images to be processed by the control system. The image acquisition device includes but is not limited to a camera, a video camera, an image acquisition module integrated with an optical system or a CCD chip, and an image acquisition module integrated with an optical system and a CMOS chip. A power supply system of the image acquisition device can be controlled by a power supply system of the cleaning robot. During movement of the robot, the image acquisition device starts to capture images. In addition, the image acquisition device can be arranged on the main body of the cleaning robot. For example, the image acquisition device can be arranged in the middle or at the edge of the top cover of the cleaning robot, or the image acquisition device can be arranged below the plane of the top surface of the cleaning robot, and in a concave structure near the geometric center of the main body or near the edge of the main body. In some embodiments, the image acquisition device can be arranged on the top surface of the cleaning robot, and the angle between the optic axis of the image acquisition device and the vertical line is ±30°. For example, the image acquisition device is located in the middle or at the edge of the top surface of the cleaning robot, and the angle between the optic axis of the image acquisition device and the vertical line is −30°, −29°, −28°, −27° . . . −1°, 0°, 1°, 2° . . . 29° or 30°. It should be noted that, those skilled in the art should understand that the angle between the optic axis and the vertical line is only an example but not to limit the accuracy of the angle thereof within the range of 1°. The accuracy of the angle can be higher according to the actual design requirements of the robot, for example, more than 0.1°, 0.01° or the like. Endless examples will not be recited herein.

The movement system is connected with the control system of the cleaning robot, and is configured to drive the cleaning robot to move based on the control instructions output by the control system. In one embodiment, the movement system includes a drive control device and at least two sets of rolling wheels, wherein at least one set of rolling wheels in at least two sets of rolling wheels is a set of controlled rolling wheels. The drive control device is connected with the control system, and is configured to drive the set of controlled rolling wheels to roll based on the control instructions output by the control system.

The drive control device includes a drive motor, and the drive motor is connected with the sets of rolling wheels and is configured to directly drive the sets of rolling wheels to roll. The drive control device can include one or more processors (CPU) or micro processing units (MCU) dedicated to the control of the drive motor. For example, the micro processing unit is configured to convert the control instructions output by the control system into electric signals which control the drive motor, and control the rotating speed and steering of the drive motor according to the electric signals so as to drive the movement of the cleaning robot. The processor in the drive control device can be shared with the processor in the control system or can be arranged independently. For example, the processor in the drive control device is used as a slave processing device, the processing device in the control system is used as a primary device, and the drive control device performs movement control based on the control of the control system. Or the processor in the drive control device is shared with the processor in the control system. The drive control device receives control instructions output by the control system through a program interface. The drive control device is configured to control the roll of the set of controlled rolling wheels based on the control instructions output by the control system.

The cleaning system is connected with the control system of the cleaning robot, and is configured to perform cleaning operations based on the control instructions output by the control system. The cleaning system includes a cleaning component and a cleaning drive control component, wherein the cleaning drive control component is connected to the control system, and the cleaning drive control component is configured to drive the cleaning component to clean the surface based on the control instructions output by the control system.

The cleaning component can include a roller brush component, a filter net, a scrubbing component, an inhaling pipeline, a dust collection box (or a garbage box), and an air draft motor, etc. Based on the actual design of a cleaning robot, the roller brush component and the scrubbing component can be both arranged on the cleaning robot, or any one of them can be arranged on the cleaning robot. The roller brush component includes but is not limited to a side brush, a side brush driver, a rolling wheel, a rolling wheel driver, etc. The scrubbing component includes but is not limited to a water container, a scrubbing cloth, a configuration structure of the cloth, and a driver of the configuration structure, etc.

The cleaning drive control component can include one or more central processing units (CPU) or micro control units (MCU) dedicated to the control of the cleaning component. The processor in the cleaning drive control component can be shared with the processor in the control system or can be arranged independently. For example, the processor in the cleaning drive control component is used as a slave processing device, the processor in the control system is used as a primary device, and the cleaning drive control component performs cleaning operation based on the control instructions output by the control system. Or the processor in the cleaning drive control component is shared with the processor in the control system.

Figure 4:
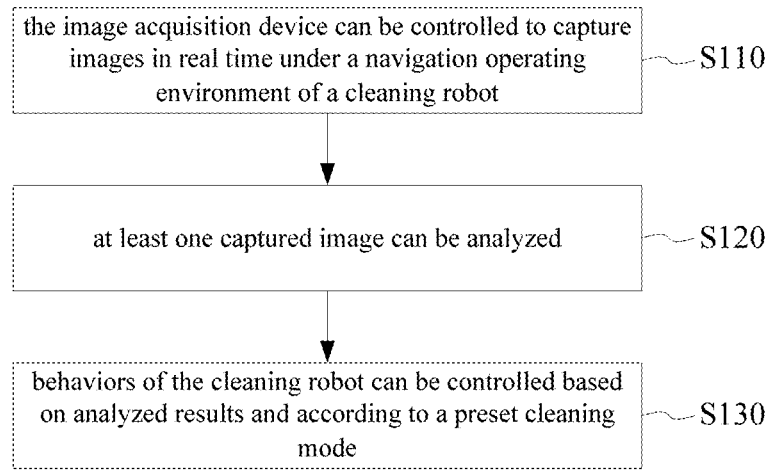
FIG. 4 shows a flow chart of a control method of a cleaning robot of the present application in one embodiment.

Please refer to FIG. 4 which shows a flow chart of a control method of a cleaning robot of the present application in one embodiment. The control method is mainly performed by a control system. The control system is configured in a cleaning robot, and the control system can be a control system as shown in FIG. 1 and the description thereof or other control system which can perform the control method. The control method includes Step 110, Step S120 and Step S130.

Herein, the Step 110, Step S120 and Step S130 can be executed by the processing device. The processing device can include one or more processors. The processing device can be operably coupled to a volatile memory and/or a non-volatile memory in the storage device. The processing device can execute instructions stored in the storage and/or non-volatile memory to perform operations in the robot, for example, analyzing the captured images and controlling behaviors of the cleaning robot based on the analyzed results. Thus, the processor can include one or more general-purpose microprocessors, one or more application specific integrated circuits (ASIC), one or more digital signal processors (DSP), one or more field programmable gate arrays (FPGA) or any combination thereof. The processing device is also operably coupled to an I/O port and an input structure, wherein the robot can interact with various other electronic apparatus by the I/O port, and the user can interact with a computing apparatus by the input structure. Therefore, the input structure can include a button, a keyboard, a mouse, a touchpad and the like. The other electronic apparatus can be a mobile motor in the movement device of the robot, or a slave processor dedicated to the control of the movement device in the robot, for example, a microcontroller unit (MCU).

In an example, the processing device is connected with the storage device, the image acquisition device, the movement system and the cleaning system respectively through data cables. The processing device interacts with the storage device through a data read-write technology, and the processing device interacts with the image acquisition device, the movement system and the cleaning system through an interface protocol. Wherein the data read-write technology includes but is not limited to a high-speed/low-speed data interface protocol, a database read-write operation and the like. The interface protocol includes but is not limited to an HDMI interface protocol, a serial interface protocol and the like.

In the Step 110, the image acquisition device can be controlled to capture images in real time under a navigation operating environment of a cleaning robot.

Herein, the processing device controls the image acquisition device to capture images in real time under a navigation operating environment of the cleaning robot. For example, the image acquisition device can be a camera used for capturing static images or videos. In one embodiment, the cleaning robot can preset a time interval for capturing images according to the navigation operating environment, and then the processing device controls the image acquisition device to capture images at the preset time interval to acquire static images at different time. In another embodiment, the processing device controls the image acquisition device to capture videos.

The navigation operating environment indicates the environment in which the robot moves according to the current localization and the navigation route determined based on the current localization and performs corresponding operations. Specifically, the navigation operating environment of a cleaning robot indicates the environment in which a cleaning robot moves according to a navigation route and performs cleaning operations.

In the Step 120, at least one captured image can be analyzed.

Herein, the processing device analyzes at least one captured image. Wherein, when the images acquired by the image acquisition device are static images, the processing device can analyze at least one image in the acquired static images. When the image acquisition device acquires video, since the video is composed of image frames, the processing device can first continuously or discontinuously collect image frames in the acquired video, and then select one frame of image to serve as an image for analysis. The processing device can analyze one or more images.

In the Step 130, behaviors of the cleaning robot can be controlled based on analyzed results and according to a preset cleaning mode, wherein the cleaning mode includes a cleaning mode corresponding to an underexposure region.

Herein, the processing device controls behaviors of the cleaning robot based on analyzed results and according to a preset cleaning mode, wherein the cleaning mode includes the cleaning mode corresponding to an underexposure region, the analyzed results include the cleaning robot being located in an underexposure region or the robot being not located in an underexposure region. The underexposure region indicates a darker region formed when objects block the light emitted by a light source (the sun or a lamp, etc.) such that the light cannot penetrate through opaque objects, such as the region under a bed or a sofa. In addition, the underexposure region can also indicate that when a cleaning robot enters a region with a weak light intensity, the amount of incoming light of the image acquisition device is insufficient, which leads to the brightness contained in the captured images is lower than a preset brightness threshold, namely, image underexposure. Wherein the brightness contained in the captured images can be described via image grayscale values, for example, when the processing device detects that the grayscale value in a region contained in the image is smaller than a preset grayscale threshold, the image can be determined to be an underexposure image, then the cleaning robot can be determined to be located in an underexposure region. In some embodiments, the brightness can also be described by the light intensity values provided by an illumination sensor in the image acquisition device, for example, the processing device acquires images and corresponding light intensity data, when the light intensity data is less than a preset light intensity threshold, the processing device determines that the cleaning robot locates in an underexposure region. Or in some embodiments, the processing device determines whether the cleaning robot locates in an underexposure region based on the grayscale values and light intensity data in the image. For example, the processing device determines that the cleaning robot is located in an underexposure region in a way of simultaneously satisfying two conditions described in the above two examples.

The preset cleaning mode can be set in advance, and is stored by the storage device in the cleaning robot. The cleaning mode can also be obtained through limiting the cleaning region of the robot in advance. In one embodiment, users can set cleaning regions in different classification manners. For example, in terms of underexposure, the cleaning region can be set, by the processing device, to include an underexposure region and a non-underexposure region. For another example, in terms of room planning, the cleaning region can be set to include a room region, a living room region, and a kitchen region, and so on. And the regions among different classifications can be overlapped with each other, for example, the regions under a bed or a sofa in the living room region can belong to an underexposure region, while other regions in the living room region can belong to a non-underexposure region. By means of each set cleaning region, users can input a cleaning mode corresponding to each cleaning region into the cleaning robot. The cleaning mode includes a cleaning mode corresponding to the underexposure region. For example, the cleaning mode corresponding to the underexposure region can be set to cleaning paused when the cleaning robot is located in an underexposure region, or cleaning delayed when the cleaning robot is located in an underexposure region, or cleaning enhanced when the cleaning robot is located in an underexposure region, or cleaning continued when the cleaning robot is located in an underexposure region. The cleaning mode can include sweeping, dust collecting, mopping or any combination thereof. For example, cleaning delayed indicates that when the cleaning robot is located in an underexposure region, the cleaning robot does not clean the underexposure region but cleans other regions, and after the other regions are cleaned, the cleaning robot returns to clean the underexposure region. Cleaning enhanced indicates that enhancing the cleaning effect through adjusting the cleaning mode of the cleaning component, for example, increasing the rotating speed of a roller brush component, spraying liquid through a liquid applicator, increasing pressure of a scrubbing component and increasing the suction force of a vacuum airway and so on. The cleaning mode can also include other cleaning modes, for example, cleaning continued when the cleaning robot is not located in an underexposure region.

The processing device in the cleaning robot can determine the cleaning mode of the corresponding underexposure region based on user input. Herein, the cleaning robot can further include a human-computer interaction device which is connected with the processing device. Users can input cleaning mode corresponding to each underexposure region on the human-computer interaction device provided by the cleaning robot. Or, the cleaning robot includes a network device which is connected with the processing device, the processing device can perform data transmission with other intelligent terminals (such as a mobile phone, a tablet computer and a personal computer) of users via the network device, the input cleaning mode corresponding to each underexposure region can be transmitted to the processing device via user's operation on other intelligent terminals, and the processing device stores the corresponding relationship in the storage device of the cleaning robot. Wherein the underexposure region can be marked in advance, or obtained through image analysis by a cleaning robot, or determined based on the label marked in advance and image analysis. Each underexposure region can correspond to a unified cleaning mode, or correspond to each cleaning mode individually, or correspond to a cleaning mode according to the classification of the underexposure region, etc.

Behaviors of the cleaning robot can include moving along the original navigation route and continue cleaning, moving along the original navigation route and pause cleaning, moving along the original route and enhance cleaning, moving along the original navigation route and delay cleaning, and modifying the navigation route and continue cleaning when the cleaning robot is located in an underexposure region. Behaviors of the cleaning robot can also include continue cleaning along the original navigation route when the cleaning robot is not located in an underexposure region.

It should be noted that, the above cleaning mode and behaviors of the cleaning robot are merely exemplary, rather than limiting the cleaning mode and behaviors of the cleaning robot in the present application. In fact, those skilled in the art can set other cleaning modes and behaviors of the cleaning robot based on the types of cleaning robot and user requirements, and these will not be described herein.

As to the control method of the cleaning robot in the present application, through the technical solution that analyzing the captured images and controlling behaviors of the cleaning robot based on the analyzed results and according to a preset cleaning mode, users can clean some certain regions depending on requirements, thereby realizing the aim of separated-area cleaning according to the requirements of users.

In order to localize the current position of the cleaning robot accurately, the Step 120 includes: determining the current position of the cleaning robot based on the localization features identified in at least one image, wherein the localization features include but are not limited to shape features and grayscale features. The shape features include but are not limited to corner features, line features, edge features and curve features. The grayscale features include but are not limited to grayscale jump features, grayscale values greater than or less than a grayscale threshold, region dimensions of a preset grayscale range contained in the image frames. In addition, in order that the cleaning robot can acquire sufficient localization features, the number of localization features identified in the images is multiple, for example, more than 10.

In one embodiment, the current position of the cleaning robot can be determined based on the localization features identified in at least one image. For example, the localization information of the robot in the current physical space is acquired through identifying the picture of an object in the captured image and matching that picture with the picture of a standard component and determining the localization information based on standard physical features of the standard component. For another example, the localization information of the robot in the current physical space can be determined through matching the features identified in the image with the features in landmark information in the preset map data. In another embodiment, the current position of the cleaning robot can be determined based on the localization features identified in at least two images. For example, the position and pose of the robot can be determined based on the position offset information of the matching features in two image frames. In still another embodiment, the cleaning robot can be localized based on the localization features identified in at least one image and landmark information created in advance. Wherein, the landmark information can be an attribute information which is collected during each navigation period and corresponds to localization points in the map data. The landmark information includes but is not limited to localization features captured by the image acquisition device on a certain localization point of the map data, the map data of the localization features in the physical space when the localization features are captured each time, the positions of the localization features in corresponding image frames when the localization features are captured each time, and position and pose of the cleaning robot when the corresponding localization features are captured. The landmark information can be stored in the storage device together with the map data. The map data can be created in advance based on an SLAM (Simultaneous Localization and Mapping) or VSLAM technology.

In addition, in the Step 120, when the processing device performs localization analysis based on at least one captured image, not necessarily limited by a time sequence, the processing device further determines whether the cleaning robot is located in an underexposure region based on the grayscale features in at least one image. In practical applications, when the cleaning robot is located in an underexposure region, the cleaning robot is usually located under a bed or a sofa. When the cleaning robot is located under a bed or a sofa, since too much dust is gathered in the region, users may not want to clean the region or users may want to clean the region after the cleaning robot finishes cleaning other regions.

Therefore, whether the robot is located in an underexposure region can be analyzed. Herein, the processing device analyzes the underexposure region based on the images captured by the image acquisition device. Herein, the images captured by the image acquisition device are usually of an RGB color mode, thus, the processing device should perform grayscale processing on the captured images to obtain grayscale images, and then the grayscale images are subjected to overexposure analysis to determine whether the image acquisition device is located in an underexposure region. Wherein, the processing device can perform grayscale processing on the captured images to obtain grayscale images through component method, a maximum value method, a mean value method or a weighted mean method and so on. Grayscale image is monochrome image with 256 gray levels or scales from black to white, wherein 255 represents white and 0 represents black.

In one embodiment, the processing device determines whether the cleaning robot is located in an underexposure region through an analysis on the grayscale distribution, and average, maximum and minimum grayscale values in the grayscale images. In one example, when the grayscale feature is indicated by grayscale distribution, and when the processing device determines that the grayscale distribution is centered in a preset grayscale underexposure interval after analyzing the grayscale distribution in the grayscale images, the processing device determines that the cleaning robot is located in an underexposure region. For example, the grayscale underexposure interval can be obtained according to technical experiences or experimental designs and is stored in the cleaning robot in advance.

In one specific example, the processing device can analyze at least one image which is captured after the amount of incoming light is adjusted by the image acquisition device. Wherein, the image acquisition device can be an image acquisition device with an adjustable aperture and/or an adjustable shutter mechanism. The adjustable aperture can adjust the amount of incoming light in the image acquisition device through adjusting the sectional area of light entering the image acquisition device. The adjustable shutter mechanism can adjust the amount of incoming light in the image acquisition device through adjusting how long light enters the image acquisition device. After the image acquisition device adjusts the exposure time and/or the aperture to increase the amount of incoming light, the processing device can acquire and analyze at least one image captured by the image acquisition device. For example, the processing device can acquire at least one image with time delay, and analyze at least one image with increased amount of incoming light. Wherein, during the time delay, the image acquisition device adjusts the exposure time and/or adjusts the aperture to increase the amount of incoming light. For another example, the processing device can determine that whether the amount of incoming light is adjusted by the image acquisition device through comparing plurality of images, and analyze at least one image with increased amount of incoming light. Herein, when the image acquisition device is in an underexposure region, the amount of incoming light can be increased automatically through enlarging the aperture, and then, the processing device performs the above underexposure analysis on at least one image captured by the adjusted image acquisition device, so as to improve the accuracy of the analyzed results. Although the manner in which the processing device analyzes the captured images can respond to the cleaning mode corresponding to the underexposure region timely, in some practical applications, since this type of image acquisition device can automatically adjust the aperture under different light intensities, the grayscale of the captured images can be generally lower as the aperture is not adjusted timely when the light intensity changes. In order to avoid the problem that the processing device analyzes a single image and obtains an inaccurate result, multiple images can be subjected to an underexposure analysis, so as to improve the accuracy of underexposure analysis.

In addition, in other practical applications, the image acquisition device can be blocked by objects within a short time period. When the image acquisition device is blocked, in order to prevent the interference of blocking on the analyzed results of the processing device, the processing device can analyze multiple images captured within a preset time duration to determine whether the cleaning robot is located in an underexposure region, wherein the preset time duration can be obtained according to technical experiences or experimental designs and is stored in the cleaning robot in advance. Generally, the preset time duration can be of a millisecond level. For example, when the processing device detects that one image is underexposed, and detects that at least one image subsequently captured by the image acquisition device is also underexposed, then the processing device determines that the robot is located in an underexposure region.

In another embodiment, whether the cleaning robot is located in an underexposure region can also be determined through analyzing the photosensitive information from a photosensitive element, wherein the photosensitive element includes but is not limited to a photoresistor, a phototriode, a photomultiplier, a CCD element, a CMOS device, etc. In addition, the photosensitive element can be arranged on the main body of the cleaning robot. For example, the photosensitive element can be arranged on the front edge along an travelling direction of the top cover of the cleaning robot, or multiple photosensitive elements can be arranged at the edge of the top cover of the cleaning robot at intervals, such that when a part of the cleaning robot enters the underexposure region, the cleaning robot can be determined to be located in an underexposure region. In some embodiments, firstly, the photosensitive element converts the induced light intensity into light intensity data and outputs them to the processing device, and then, the processing device analyzes the light intensity data to determine whether the cleaning robot is located in an underexposure region. For example, the processing device presets an underexposure threshold, the processing device determines that the cleaning robot is located in the underexposure region when the obtained light intensity data is lower than the underexposure threshold; otherwise, the processing device determines that the cleaning robot is not located in the underexposure region, wherein the underexposure threshold can be obtained according to technical experiences or experimental designs and is stored in the cleaning robot in advance.

It should be noted that, the manner of determining whether the cleaning robot is located in an underexposure region based on the above one or more analyzing methods is only an example but does not limit the methods for determining whether the cleaning robot is located in an underexposure region in the present application. In fact, those skilled in the art can also determine whether the cleaning robot is located in an underexposure region though evaluating whether the cleaning robot is located in an underexposure region based on the results obtained by multiple grayscale analysis methods in combination with photosensitive element method. These methods will not be described herein. However, the method for determining that the cleaning robot is located in an underexposure region based on the analysis on any image grayscale values mentioned in the present application or based on the improvement on these basis should be deemed as a specific example of the present application.

When the processing device controls the movement system to move to an underexposure region based on a route which is planned in advance, a corresponding cleaning mode can be used to move and perform cleaning operations, wherein in the Step 130, the manner of controlling behaviors of the cleaning robot based on analyzed results and according to a preset cleaning mode includes any of the following manners:

1) adjusting the navigation route of the cleaning robot to leave the underexposure region. Please refer to FIG. 2 which shows a schematic diagram of a cleaning robot of the present application in the underexposure region in one embodiment. As shown in the figure, in the example, the underexposure region is the region under a bed, and the preset cleaning mode corresponding to the underexposure region is not to clean. During the operation of the cleaning robot, the cleaning robot moves along the direction shown by the arrow A in the figure according to the original navigation route and performs cleaning operations, and when the processing device of the cleaning robot analyzes that the cleaning robot is located in the underexposure region, namely under the bed, through any of the above manners, the processing device modifies the navigation route and controls the movement system to leave the underexposure region. In this example, the cleaning robot moves continuously after deflecting by 180° along the rotation arrow B as shown in the figure, such that the cleaning robot leaves the bed, and moves along the direction shown by the arrow C and cleans other non-underexposure regions. It should be noted that, those skilled in the art should understand the cleaning robot moving continuously after deflecting by 180° along the rotation arrow B in the figure is merely exemplary, the deflection angle is not only 180°, and based on actual requirements, multiple deflection angles can be arranged flexibly and will not be enumerated herein.

2) controlling the cleaning robot to go through the underexposure region according to the original navigation route, and controlling the cleaning robot to clean the underexposure region according to a preset cleaning mode corresponding to the underexposure region. Please refer to FIG. 3 which shows a schematic diagram of a cleaning robot of the present application in the underexposure region in another embodiment. As shown in the figure, in one example, the underexposure region is the region under a bed, and the preset cleaning mode corresponding to the underexposure region is not to clean. During the operation of the cleaning robot, the cleaning robot moves along the direction shown by the arrow A in the figure according to the original navigation route and performs cleaning operations, and when the processing device of the cleaning robot analyzes that the cleaning robot is located in the underexposure region, namely under the bed, through any of the above manners, on the one hand, the processing device controls the movement system to move along the original route in the direction as shown by the arrow B in the figure, and on the other hand, the processing device controls the cleaning system not to clean the underexposure region in which the cleaning robot is located now, until the cleaning robot is detected in an non-underexposure region, the processing device controls the movement system to move along the original route in the direction as shown by the arrow C in the figure and controls the cleaning system to perform cleaning operations according to the cleaning mode corresponding to a non-underexposure cleaning region. In another example, the preset cleaning mode corresponding to an underexposure region is cleaning enhanced. During the operation of the cleaning robot, the cleaning robot moves along the direction shown by the arrow A in the figure according to the original navigation route and performs cleaning operations. When the processing device of the cleaning robot analyzes that the cleaning robot is located in the underexposure region, namely under the bed, through any of the above manners, on the one hand, the processing device controls the movement system to move along the original route in the direction as shown by the arrow B in the figure, and on the other hand, the processing device controls the cleaning system to perform enhanced cleaning on the underexposure region in which the cleaning robot is located, until the cleaning robot is detected in an non-underexposure region, the processing device controls the movement system to move along the original route in the direction as shown by the arrow C in the figure and controls the cleaning system to perform conventional cleaning operations according to the cleaning mode corresponding to a non-underexposure cleaning region.

In a space which need to be cleaned and is not irradiated by a light source, such as a room in which no light is turned on, it is inaccurate for the processing device to control the cleaning system and the movement system in the manner that the cleaning robot can be controlled to use the cleaning mode of not to clean only based on the grayscale features or the photosensitive information of the photosensitive elements. In order to match with various practical applications, the storage device is stored with map data and landmark information, wherein the landmark information not only includes the above attribute information, but also includes the object information characterized by the localization features and the attribute corresponding to the underexposure region. The control method further includes a step of creating the landmark information of an underexposure region in the map data which are created in advance under a navigation operating environment. When the processing device determines that the cleaning robot moves from a non-underexposure region to an underexposure region, or moves from an underexposure region to a non-underexposure region, attribute information can be added in the map data which are created in advance. For example, the processing device determines the boundary positions of the underexposure region and the non-underexposure region based on real-time localization; and then, the processing device adds the attribute containing the underexposure region at the boundary position in the map data, or adds the attribute of the underexposure region in the existing landmark information near the boundary position.

In practical applications, since home decor items and light source can change. For example, the feature of the landmark information of the current position is recorded as non-underexposure when the current position is not placed with a sofa, and after a sofa is moved to this position, when the cleaning robot moves to the position, the cleaning robot analyzes that it is located in an underexposure region. For another example, when the sunlight comes into the room, the corresponding room is not an underexposure region, however, when night comes and no light is turned on for illumination, the room is an underexposure region. Therefore, the control method further includes a step of updating the landmark information of a corresponding underexposure region in the map data created in advance. For example, when the processing device determines that the cleaning robot is located in an underexposure region after an underexposure analysis based on the image or photosensitive device and determines the corresponding landmark information is the attribute of the non-underexposure region, the processing device updates the corresponding landmark information; or when the processing device determines that the cleaning robot is located in a non-underexposure region after an underexposure analysis based on the image or photosensitive device and determines the corresponding landmark information is the attribute of the underexposure region, the processing device updates the corresponding landmark information.

On the basis of the above landmark information is contained, the step of controlling behaviors of the cleaning robot based on the preset cleaning mode includes navigating the cleaning robot based on the preset cleaning mode, the localization information identified in at least one image and the landmark information, wherein the landmark information contains the attribute of the underexposure region and the attribute of the non-underexposure region. In one specific example, the processing device creates a cleaning route which does not contain the underexposure region according to the preset cleaning mode in which the underexposure region is not cleaned and the non-underexposure region is cleaned and according to the landmark information containing the underexposure region attribute in the map data, determines the current position of the cleaning robot based on at least one image captured along the cleaning route, and controls the movement system to move and perform cleaning operations along the cleaning route, then the underexposure region is not cleaned. In another specific example, based on a preset cleaning mode of delay and enhance cleaning in the underexposure region and continue cleaning in the non-underexposure region, and based on the landmark information containing the underexposure region attribute in the map data, the processing device creates a first route of cleaning the non-underexposure region, a second route of moving to the underexposure region from the tail end of the route of the non-underexposure region, and a third route of cleaning the underexposure region; determines the current position of the cleaning robot based on at least one image captured along the first route, and controls the movement system to move and perform cleaning operations along the first route; and the processing device performs localization operation according to the captured images and controls the movement system to move to the initial end of the third route from the tail end of the first route along the second route, and controls the cleaning system not to perform cleaning operations during the period of moving along the second route; and then, the processing device controls the cleaning system to perform corresponding cleaning operations during the period of moving along the third route according to a preset mode of enhance cleaning. Wherein, when moving along the third route, the processing device can perform localization of the current position of the cleaning robot and navigation of the cleaning robot only based on the movement data provided by the movement sensing device in the cleaning robot.

After analysis, when the cleaning robot is determined to be located at the doorway of a room and the corresponding room is located in the underexposure region, the processing device controls behaviors of the cleaning robot according to the cleaning mode of the corresponding room. For example, when the processing device moves to the entrance of a room with no illumination according to the landmark information, the processing device determines that the cleaning robot is located in an underexposure region based on image analysis, the processing device can obtain the door attribute from the localization features identified from the cached image before entering the room and the landmark information containing the identified localization features, so as to determine that the underexposure region is a room need to be cleaned. And then, the processing device can calculate the moved distance and the current position based on the movement data provided by the movement sensing device in the cleaning robot, and controls the movement system in the cleaning robot to move in the room according to the original navigation route. Meanwhile, the processing device further controls the cleaning system of the cleaning robot to clean the surface and the wall of the room.

In addition, in some embodiments, the control method can also include the stop of outputting prompt information after entering an underexposure region. For example, after entering an underexposure region, the processing device can remind users of entering the underexposure region through sounding an alarm or sending messages to a mobile terminal of users.

The present application further provides a cleaning robot. Please refer to FIG. 5 which shows a structural schematic diagram of a cleaning robot of the present application in one embodiment. As shown in the figure, the cleaning robot includes a control system 21, an image acquisition device 22, a movement system 23 and a cleaning system 24. The image acquisition device 22, the movement system 23 and the cleaning system 24 are all connected with the control system 21. The control system 21 is configured to output control instructions corresponding to a preset cleaning mode based on the results of analyzing the captured images, the image acquisition device 22 is configured to capture images to be processed by the control system, the movement system 23 is configured to drive the cleaning robot to move based on the control instructions, and the cleaning system 24 is configured to perform cleaning operations based on the control instructions. Wherein the control instructions include but are not limited to movement direction, movement speed and movement distance determined based on the navigation route and the current position, and cleaning operations performed according to a preset cleaning mode.

The image acquisition device 22 includes but is not limited to a camera, a video camera, an image acquisition module integrated with an optical system or a CCD chip, and an image acquisition module integrated with an optical system and a CMOS chip. A power supply system of the image acquisition device can be controlled by a power supply system of the cleaning robot. During movement of the robot, the image acquisition device starts to capture images. In addition, the image acquisition device can be arranged on the main body of the cleaning robot. For example, the image acquisition device can be arranged in the middle or at the edge of the top cover of the cleaning robot, or the image acquisition device can be arranged below the plane of the top surface of the cleaning robot, and in a concave structure near the geometric center of the main body or near the edge of the main body.

In some embodiments, the image acquisition device can be arranged on the top surface of the cleaning robot, and the angle between the optic axis of the image acquisition device and the vertical line is ±30°. For example, the image acquisition device is located in the middle or at the edge of the top surface of the cleaning robot, and the angle between the optic axis of the image acquisition device and the vertical line is −30°, −29°, −28°, −27° . . . −1°, 0°, 1°, 2° . . . 29° or 30°. It should be noted that, those skilled in the art should understand that the angle between the optic axis and the vertical line is only an example but not to limit the accuracy of the angle thereof within the range of 1°. The accuracy of the angle can be higher according to the actual design requirements of the robot, for example, more than 0.1°, 0.01° or the like. Endless examples will not be recited herein.

In some embodiments, the image acquisition device can include an adjustable aperture and/or an adjustable shutter mechanism which are used to adjust the amount of incoming light in the image acquisition device, and the control system can analyze at least one image which is captured after the amount of incoming light being adjusted by the image acquisition device. The adjustable aperture can adjust the amount of incoming light in the image acquisition device through adjusting the sectional area of light entering the image acquisition device. The adjustable shutter mechanism can adjust the amount of incoming light in the image acquisition device through adjusting how long light enters the image acquisition device. After the image acquisition device adjusts the exposure time and/or the aperture to increase the amount of incoming light, the processing device can acquire and analyze at least one image captured by the image acquisition device. For example, the processing device can acquire at least one image with time delay, and analyze at least one image with increased amount of incoming light. Wherein, during the time delay, the image acquisition device adjusts the exposure time and/or adjusts the aperture to increase the amount of incoming light. For another example, the processing device can determine that whether the amount of incoming light is adjusted by the image acquisition device through comparing plurality of images, and analyze at least one image with increased amount of incoming light. Herein, when the image acquisition device is in an underexposure region, the amount of incoming light can be increased automatically through enlarging the aperture, and then, the processing device performs the above underexposure analysis on at least one image captured by the adjusted image acquisition device, so as to improve the accuracy of the analyzed results.

The movement system 23 can move under the control of the control system 21, and the movement system is arranged on the bottom of the cleaning robot. In one embodiment, the movement system 23 includes a drive control device and at least two sets of rolling wheels, wherein at least one set of rolling wheels in at least two sets of rolling wheels is a set of controlled rolling wheels. The drive control device is connected with the control system, and the drive control device is configured to drive the set of controlled rolling wheels to roll based on the control instructions output by the control system.

The drive control device includes a drive motor, and the drive motor is connected with the set of rolling wheels and is configured to directly drive the set of rolling wheels to roll. The drive control device can include one or more processors (for example, CPU or micro processing unit (MCU)) dedicated to the control of the drive motor. For example, the micro processing unit is configured to convert the control instructions output by the control system into electric signals used to control the drive motor, and control the rotating speed and steering of the drive motor according to the electric signals so as to drive the cleaning robot to move. The processor in the drive control device can be shared with the processor in the control system or can be arranged independently. For example, the processor in the drive control device is used as a slave processing device, the processor in the control system is used as a primary device, and the drive control device performs movement control based on the control of the control system. Or the processor in the drive control device is shared with the processor in the control system. The drive control device receives control instructions output by the control system through a program interface. The drive control device is configured to drive the set of controlled rolling wheels to roll based on the control instructions output by the control system.

The cleaning system 24 can perform cleaning operation under the control of the control system 21. In one embodiment, the cleaning system includes a cleaning component and a cleaning drive control component, wherein the cleaning drive control component is connected to the control system, and the cleaning drive control component is configured to drive the cleaning component to clean the surface based on the control instructions output by the control system.

The cleaning component can include a roller brush component, a filter net, a scrubbing component, an inhaling pipeline, a dust collection box (or a garbage box), and an air draft motor, etc. Based on the actual design of a cleaning robot, the roller brush component and the scrubbing component can be both arranged on the cleaning robot, or any one of them can be arranged on the cleaning robot. The roller brush component includes but is not limited to a side brush, a side brush driver, a rolling wheel, a rolling wheel driver, etc. The scrubbing component includes but is not limited to a water container, a scrubbing cloth, a configuration structure of the cloth, and a driver of the configuration structure, etc.

The cleaning drive control component can include one or more processors (for example, CPU or micro processing unit (MCU)) dedicated to the control of the cleaning component. The processor in the cleaning drive control component can be shared with the processor in the control system or can be arranged independently. For example, the processor in the cleaning drive control component is used as a slave processing device, the processor in the control system is used as a primary device, and the cleaning drive control component performs cleaning operations based on the control instructions output by the control system. Or the processor in the cleaning drive control component is shared with the processor in the control system.

Figure 5:
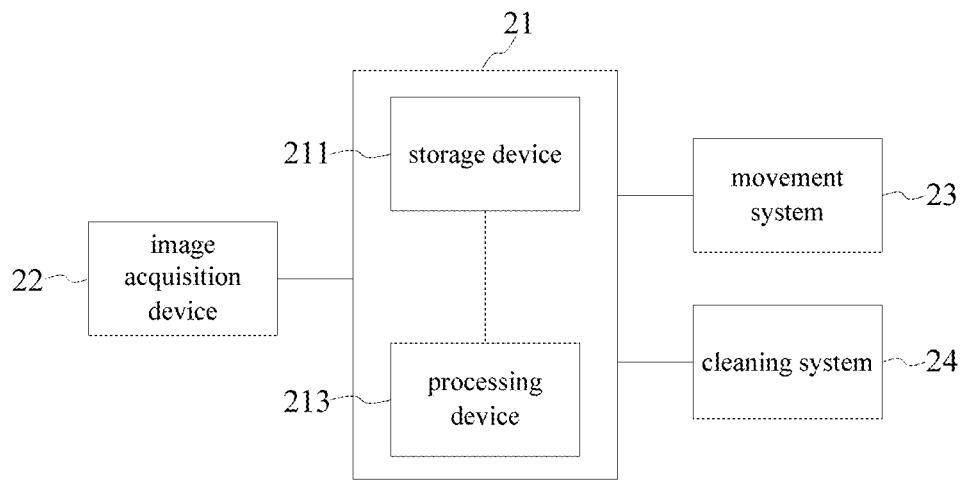
FIG. 5 shows a structural schematic diagram of a cleaning robot of the present application in one embodiment.

The control system performs control processing as shown in FIG. 1 and in combination with the above corresponding description based on FIG. 1, and will not be described in detail herein, wherein the storage device 211 shown in FIG. 5 can be corresponding to the storage device 11 shown in FIG. 1; and the processing device 213 shown in FIG. 5 can be corresponding to the processing device 13 shown in FIG. 1. With the control system 21 shown in FIG. 5 including a storage device 211 and a processing device 213, and the control system 21 being connected with a movement system 23, the cleaning system 24 and the image acquisition device 22 as an example, the working process in which the control system 21 of the cleaning robot outputs control instructions corresponding to a preset cleaning mode based on the results of analyzing the captured images is described.

The storage device 211 is configured to store one or more programs. The programs include corresponding programs invoked by the processing device 213 to perform steps such as controlling and analyzing which will be described below. The processing device 213 performs control processing through invoking the programs stored in the storage device 211.

Firstly, the processing device controls the image acquisition device to capture images in real time under a navigation operating environment of the cleaning robot. For example, the image acquisition device can be a camera configured to capture static images or videos. In some embodiments, the image acquisition device can include an adjustable aperture. The image acquisition device can increase the amount of incoming light through adjusting the aperture so as to change the intensity of lights acquired by the image acquisition device. After the amount of incoming light is compensated, the processing device controls the image acquisition device to capture images, and in subsequent processing, the processing device analyzes the images captured by the adjusted image acquisition device. In addition, Besides adjusting the aperture, the processing device can also adjust the exposure time of the image acquisition device to increase the amount of incoming light.

Next, the processing device analyzes at least one captured image, wherein when the images acquired by the image acquisition device are static images, the processing device can analyze at least one image in the acquired static images. When the image acquisition device acquires video, the processing device can continuously or discontinuously collect image frames in the acquired video, and then select one frame of image to serve as an image for analysis. In some embodiments, the processing device can analyze multiple images captured within a preset time duration, wherein, the preset time duration can be obtained according to technical experiences or experimental designs and is stored in the cleaning robot in advance. Generally, the preset time duration can be of a millisecond level.

The processing device can determine the current position of the cleaning robot based on the localization features identified in at least one image. In another embodiment, the processing device can localize the cleaning robot based on the localization features identified in at least one image and landmark information created in advance. Wherein, the landmark information can be an attribute information which is collected during each navigation period and corresponds to localization points in the map data. The landmark information includes but is not limited to localization features captured by the image acquisition device on a certain localization point of the map data, the map data of the localization features in the physical space when the localization features are captured each time, the positions of the localization features in corresponding image frames when the localization features are captured each time, and position and pose of the cleaning robot when the corresponding localization features are captured. The landmark information can be stored in the storage device together with the map data. The map data can be created in advance based on an SLAM (Simultaneous Localization and Mapping) or VSLAM technology.

In addition, the processing device can analyze whether the cleaning robot is located in the underexposure region based on the grayscale features in at least one image. In another embodiment, the processing device can determine whether the cleaning robot is located in the underexposure region through an analysis on photosensitive information from photosensitive elements.

And then, the processing device controls behaviors of the cleaning robot based on analyzed results and according to a preset cleaning mode, wherein the cleaning mode includes a cleaning mode corresponding to an underexposure region.

In some embodiments, the processing device in the cleaning robot can determine a cleaning mode corresponding to the underexposure region based on user input. In addition, the manner in which the processing device controls behaviors of the cleaning robot based on analyzed results and according to a preset cleaning mode includes any of the following manners: 1) adjusting the navigation route of the cleaning robot to leave the underexposure region. Please refer to FIG. 2 which shows a schematic diagram of a cleaning robot of the present application in the underexposure region in one embodiment. As shown in the figure, in the example, the underexposure region is the region under a bed, and the preset cleaning mode corresponding to the underexposure region is not to clean. During the operation of the cleaning robot, the cleaning robot moves along the direction shown by the arrow A in the figure according to the original navigation route and performs cleaning operations, and when the processing device of the cleaning robot analyzes that the cleaning robot is located in the underexposure region, namely under the bed, through any of the above manners, the processing device modifies the navigation route and controls the movement system to leave the underexposure region. In this example, the cleaning robot moves continuously after deflecting by 180° along the rotation arrow B as shown in the figure, such that the cleaning robot leaves the bed, and moves along the direction shown by the arrow C and cleans other non-underexposure regions. It should be noted that, those skilled in the art should understand the cleaning robot moving continuously after deflecting by 180° along the rotation arrow B in the figure is merely exemplary, the deflection angle is not only 180°, and based on actual requirements, multiple deflection angles can be arranged flexibly and will not be enumerated herein. 2) controlling the cleaning robot to go through the underexposure region according to the original navigation route, and controlling the cleaning robot to clean the underexposure region according to a preset cleaning mode corresponding to the underexposure region. Please refer to FIG. 3 which shows a schematic diagram of a cleaning robot of the present application in the underexposure region in another embodiment. As shown in the figure, in one example, the underexposure region is the region under a bed, and the preset cleaning mode corresponding to the underexposure region is not to clean. During the operation of the cleaning robot, the cleaning robot moves along the direction shown by the arrow A in the figure according to the original navigation route and performs cleaning operations, and when the processing device of the cleaning robot analyzes that the cleaning robot is located in the underexposure region, namely under the bed, through any of the above manners, on the one hand, the processing device controls the movement system to move along the original route in the direction as shown by the arrow B in the figure, and on the other hand, the processing device controls the cleaning system not to clean the underexposure region in which the cleaning robot is located now, until the cleaning robot is detected in an non-underexposure region, the processing device controls the movement system to move along the original route in the direction as shown by the arrow C in the figure and controls the cleaning system to perform cleaning operations according to the cleaning mode corresponding to a non-underexposure cleaning region. In another example, the preset cleaning mode corresponding to an underexposure region is cleaning enhanced. During the operation of the cleaning robot, the cleaning robot moves along the direction shown by the arrow A in the figure according to the original navigation route and performs cleaning operations. When the processing device of the cleaning robot analyzes that the cleaning robot is located in the underexposure region, namely under the bed, through any of the above manners, on the one hand, the processing device controls the movement system to move along the original route in the direction as shown by the arrow B in the figure, and on the other hand, the processing device controls the cleaning system to perform enhanced cleaning on the underexposure region in which the cleaning robot is located, until the cleaning robot is detected in an non-underexposure region, the processing device controls the movement system to move along the original route in the direction as shown by the arrow C in the figure and controls the cleaning system to perform conventional cleaning operations according to the cleaning mode corresponding to a non-underexposure cleaning region.

In practical applications, for example, in a space which need to be cleaned and is not irradiated by a light source, such as a room in which no light is turned on, it is inaccurate for the processing device to control the cleaning system and the movement system in the manner that the cleaning robot can be controlled to use the cleaning mode of not to clean only based on the grayscale features or the photosensitive information of the photosensitive elements. In order to match with various practical applications, the storage device is stored with map data and landmark information, wherein the landmark information not only includes the above attribute information, but also includes the object information characterized by the localization features and the attribute corresponding to the underexposure region. The processing device further performs a step of creating the landmark information of an underexposure region in the map data which are created in advance under a navigation operating environment. When the processing device determines that the cleaning robot moves from a non-underexposure region to an underexposure region, or moves from an underexposure region to a non-underexposure region, attribute information can be added in the map data which are created in advance.

In addition, since home decor items and the light source can change. In view of this, the processing device further performs a step of updating the landmark information of a corresponding underexposure region in the map data created in advance. For example, when the processing device determines that the cleaning robot is located in an underexposure region after an underexposure analysis based on the image or photosensitive device and determines the corresponding landmark information is the attribute of the non-underexposure region, the processing device updates the corresponding landmark information; or when the processing device determines that the cleaning robot is located in a non-underexposure region after an underexposure analysis based on the image or photosensitive device and determines the corresponding landmark information is the attribute of the underexposure region, the processing device updates the corresponding landmark information.

On the basis of the above landmark information is contained, the processing device navigates the cleaning robot based on the preset cleaning mode, the localization information identified in at least one image and the landmark information, wherein the landmark information contains the attribute of the underexposure region and the attribute of the non-underexposure region. In one specific example, the processing device creates a cleaning route which does not contain the underexposure region according to the preset cleaning mode in which the underexposure region is not cleaned and the non-underexposure region is cleaned and according to the landmark information containing the underexposure region attribute in the map data, determines the current position of the cleaning robot based on at least one image captured along the cleaning route, and controls the movement system to move and perform cleaning operations along the cleaning route, then the underexposure region is not cleaned. In another specific example, based on a preset cleaning mode of delay and enhance cleaning in the underexposure region and continue cleaning in the non-underexposure region, and based on the landmark information containing the underexposure region attribute in the map data, the processing device creates a first route of cleaning the non-underexposure region, a second route of moving to the underexposure region from the tail end of the route of the non-underexposure region, and a third route of cleaning the underexposure region; determines the current position of the cleaning robot based on at least one image captured along the first route, and controls the movement system to move and perform cleaning operations along the first route; and the processing device performs localization operation according to the captured images and controls the movement system to move to the initial end of the third route from the tail end of the first route along the second route, and controls the cleaning system not to perform cleaning operations during the period of moving along the second route; and then, the processing device controls the cleaning system to perform corresponding cleaning operations during the period of moving along the third route according to a preset mode of enhance cleaning. Wherein, when moving along the third route, the processing device can perform localization of the current position of the cleaning robot and navigation of the cleaning robot only based on the movement data provided by the movement sensing device in the cleaning robot.

After analysis, when the cleaning robot is determined to be located at the doorway of a room and the corresponding room is located in the underexposure region, the processing device controls behaviors of the cleaning robot according to the cleaning mode of the corresponding room. For example, when the processing device moves to the entrance of a room with no illumination according to the landmark information, the processing device determines that the cleaning robot is located in an underexposure region based on image analysis, the processing device can obtain the door attribute from the localization features identified from the cached image before entering the room and the landmark information containing the identified localization features, so as to determine that the underexposure region is a room need to be cleaned. And then, the processing device can calculate the moved distance and the current position based on the movement data provided by the movement sensing device in the cleaning robot, and controls the movement system in the cleaning robot to move in the room according to the original navigation route. Meanwhile, the processing device further controls the cleaning system of the cleaning robot to clean the surface and the wall of the room.

In addition, in some embodiments, the processing device can remind users that the cleaning robot has entered an underexposure region through sounding an alarm or through sending messages to a mobile terminal of users after the processing device enters the underexposure region.

In addition, it should also be noted that, through the description of the above implementations, those skilled in the art can clearly understand that part or all of the present application can be realized by means of software and in combination with necessary general-purpose hardware platforms. Based on this, the present application further provides a storage medium of an computer apparatus, the storage medium stores at least one program, and when the program are executed by processor, the control method described above can be performed.

Based on this understanding, the technical solutions of the present application essentially or the part contributing to the prior art can be embodied in the form of a software product, the computer software product can include one or more machine readable media which store machine executable instructions thereon, when these instructions are executed by one or more machines such as a computer, a computer network or other electronic apparatus, such one or more machines can execute operations based on the embodiments of the present application, for example, executing each step in the control method of the mobile robot, etc. The machine readable media include but are not limited to, a floppy disk, an optical disk, a CD-ROM (a compact disc-read only memory), a magnetic optical disc, an ROM (read-only memory), an RAM (random access memory), an EPROM (erasable programmable read-only memory), an EEPROM (electrically erasable programmable read-only memory), a magnetic card or optical card, a flash memory or other types of media/machine readable media which are applicable to storing machine executable instructions. Wherein the storage media can be located in the mobile robot and can also be located in a third-party server, for example, in a server providing a certain application store. Specific application stores are not limited herein, and can be a MIUI application store, a Huawei application store, and an Apple application store, etc.

The application can be used in numerous general-purpose or special-purpose calculating system environments or configurations, for example, personal computer, server computer, handheld device or portable device, tablet device, multiprocessor system, microprocessor based system, set top box, programmable consumer electronic device, network PC, small-size computer, large-scale computer, and a distributed computing environment containing any of the above system or device.

The present application can be described in the general context of the computer executable instructions executed by the computer, such as a program module. Generally, the program module includes routines, programs, objects, components, data structures and the like which execute particular tasks or realize particular abstract data types. The present application can also be practiced in the distributed computing environments. In these distributed computing environments, tasks are executed by remote processing devices which are connected via a communication network. In the distributed computing environments, the program module can be located in a local and remote computer storage medium including a storage device.

While preferred embodiments of the present invention have been shown and described herein, it will be obvious to those skilled in the art that such embodiments are provided by way of example only. It is not intended that the invention be limited by the specific examples provided within the specification. While the invention has been described with reference to the aforementioned specification, the descriptions and illustrations of the embodiments herein are not meant to be construed in a limiting sense. Numerous variations, changes, and substitutions will now occur to those skilled in the art without departing from the invention. Furthermore, it shall be understood that all aspects of the invention are not limited to the specific depictions, configurations or relative proportions set forth herein which depend upon a variety of conditions and variables. It should be understood that various alternatives to the embodiments of the invention described herein may be employed in practicing the invention. It is therefore contemplated that the invention shall also cover any such alternatives, modifications, variations or equivalents. It is intended that the following claims define the scope of the invention and that methods and structures within the scope of these claims and their equivalents be covered thereby.

What is claimed is:

1. A system for controlling a cleaning robot, wherein the cleaning robot comprises an image acquisition device, a movement system and a cleaning system, and the system for controlling a cleaning robot comprises:
   a storage device, configured to store one or more programs; and
   a processing device, connected with the storage device and configured to perform the following steps through invoking the one or more programs:
      under a navigation operating environment of the cleaning robot, controlling the image acquisition device to capture images in real time;
      analyzing at least one captured image; and
      controlling behaviors of the cleaning robot based on analyzed results and according to a preset cleaning mode, wherein the cleaning mode comprises a cleaning mode corresponding to an underexposure region.

2. The system for controlling a cleaning robot of claim 1, wherein, the step of analyzing at least one captured image comprises: determining the current position of the cleaning robot based on the localization features identified in at least one image.

3. The system for controlling a cleaning robot of claim 2, wherein, the step of determining the current position of the cleaning robot based on the localization features identified in at least one image comprises: localizing the cleaning robot based on the localization features identified in at least one image and landmark information created in advance.

4. The system for controlling a cleaning robot of claim 1, wherein, the step of analyzing at least one captured image comprises: analyzing whether the cleaning robot is located in an underexposure region based on the grayscale features in at least one image.

5. The system for controlling a cleaning robot of claim 1, wherein, the processing device is further configured to perform a step of determining whether the cleaning robot is located in an underexposure region by analyzing the photosensitive information from photosensitive elements.

6. The system for controlling a cleaning robot of claim 1, wherein, the processing device is further configured to perform a step of analyzing at least one image which is captured after the amount of incoming light in the image acquisition device being adjusted.

7. The system for controlling a cleaning robot of claim 6, wherein, the manner of adjusting the amount of incoming light in the image acquisition device comprises at least one of: adjusting an aperture of the image acquisition device and adjusting the exposure time of the image acquisition device.

8. The system for controlling a cleaning robot of claim 1, wherein, the step of analyzing at least one captured image comprises: analyzing multiple images captured within a preset time duration to determine whether the cleaning robot is located in an underexposure region.

9. The system for controlling a cleaning robot of claim 1, wherein, the processing device is further configured to perform a step of creating landmark information of the underexposure region in map data created in advance; or a step of updating the landmark information of the corresponding underexposure region in the map data created in advance.

10. The system for controlling a cleaning robot of claim 9, wherein, the step of controlling behaviors of the cleaning robot according to a preset cleaning mode comprises: navigating the cleaning robot based on a preset cleaning mode, localization information identified in at least one image and the landmark information.

11. The system for controlling a cleaning robot of claim 1, wherein, the processing device is further configured to perform a step of determining the cleaning mode of the corresponding underexposure region based on user input.

12. The system for controlling a cleaning robot of claim 1, wherein, the step of controlling behaviors of the cleaning robot based on the analyzed results and according to a preset cleaning mode comprises any of the following step:
   adjusting the navigation route of the cleaning robot to leave the underexposure region;
   controlling the cleaning robot to go through the underexposure region according to the original navigation route, and controlling the cleaning robot to clean the underexposure region according to a preset cleaning mode corresponding to the underexposure region.

13. The system for controlling a cleaning robot of claim 1, wherein, the processing device is further configured to perform a step of outputting prompt information after entering the underexposure region.

14. A cleaning robot, comprising:
   a system for controlling a cleaning robot, configured to output control instructions corresponding to a preset cleaning mode based on analytic result of the captured images, the system for controlling a cleaning robot comprises:
      a storage device, configured to store one or more programs; and
      a processing device, connected with the storage device and configured to perform the following steps through invoking the one or more programs:
         under a navigation operating environment of the cleaning robot, controlling the image acquisition device to capture images in real time;
         analyzing at least one captured image; and
         controlling behaviors of the cleaning robot based on analyzed results and according to a preset cleaning mode, wherein the cleaning mode comprises a cleaning mode corresponding to an underexposure region;
   an image acquisition device, connected to the control system and configured to capture images to be processed by the control system;
   a movement system, connected with the control system and configured to drive the cleaning robot to move based on the control instructions; and
   a cleaning system, connected with the control system and configured to perform cleaning operations based on the control instructions.

15. The cleaning robot of claim 14, wherein, the image acquisition device is located on the top surface of the cleaning robot, and the angle between the optic axis of the image acquisition device and the vertical line is ±30°.

16. The cleaning robot of claim 14, wherein, the image acquisition device comprises at least one of an adjustable aperture and an adjustable shutter mechanism which are used to adjust the amount of incoming light in the image acquisition device, and the control system can analyze at least one image which is captured after the amount of incoming light being adjusted by the image acquisition device.

17. The cleaning robot of claim 14, wherein, the movement system comprises:

at least two sets of rolling wheels, wherein at least one set of rolling wheels is a set of controlled rolling wheels; and a drive control device, connected with the control system and configured to drive the set of controlled rolling wheels to roll based on the control instructions.

18. The cleaning robot of claim 14, wherein, the cleaning system comprises:

a cleaning component; and a cleaning drive control component, connected to the control system and configured to drive the cleaning component to clean the surface based on the control instructions.

19. A method for controlling a cleaning robot, wherein the cleaning robot comprises an image acquisition device, a movement system and a cleaning system, and the method comprises the following steps:

under a navigation operating environment of the cleaning robot, controlling the image acquisition device to capture images in real time;

analyzing at least one captured image; and controlling behaviors of the cleaning robot based on analyzed results and according to a preset cleaning mode, wherein the cleaning mode comprises a cleaning mode corresponding to an underexposure region.

* * * * *